US006246833B1

(12) United States Patent
Harada

(10) Patent No.: US 6,246,833 B1
(45) Date of Patent: Jun. 12, 2001

(54) PHOTOGRAPHIC LENS AND PHOTOGRAPHING APPARATUS HAVING THE SAME

(75) Inventor: Akira Harada, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/251,493

(22) Filed: Feb. 17, 1999

(30) Foreign Application Priority Data

| Feb. 19, 1998 | (JP) | 10-054437 |
| Feb. 9, 1999 | (JP) | 11-031287 |

(51) Int. Cl.⁷ .............. G03B 17/00; G02B 15/14
(52) U.S. Cl. ............................ 396/79; 359/686
(58) Field of Search ................... 396/72, 79, 82; 359/686, 687

(56) References Cited

U.S. PATENT DOCUMENTS 3,507,555 * 4/1970 Isshiki .................... 359/686
4,906,079 * 3/1990 Mihara et al. ............ 359/686

FOREIGN PATENT DOCUMENTS

| 63-179308 | 7/1988 | (JP) . |
| 4-110811 | 4/1992 | (JP) . |
| 8-76012 | 3/1996 | (JP) . |
| 2556986 | 9/1996 | (JP) . |

* cited by examiner

Primary Examiner—W. B. Perkey
(74) Attorney, Agent, or Firm—Fitzpatrick, Cella, Harper & Scinto

(57) ABSTRACT

A photographic lens includes, in order from an object side to an image side, a first lens unit of positive refractive power, a second lens unit of negative refractive power, a third lens unit of positive refractive power and a fourth lens unit of negative refractive power, wherein, during focusing from an infinitely distant object to a minimum-distance object, the first lens unit remains stationary, the second lens unit moves toward the image side, the third lens unit moves toward the object side and the fourth lens unit moves in such a way as to include a locus convex toward the object side.

23 Claims, 15 Drawing Sheets

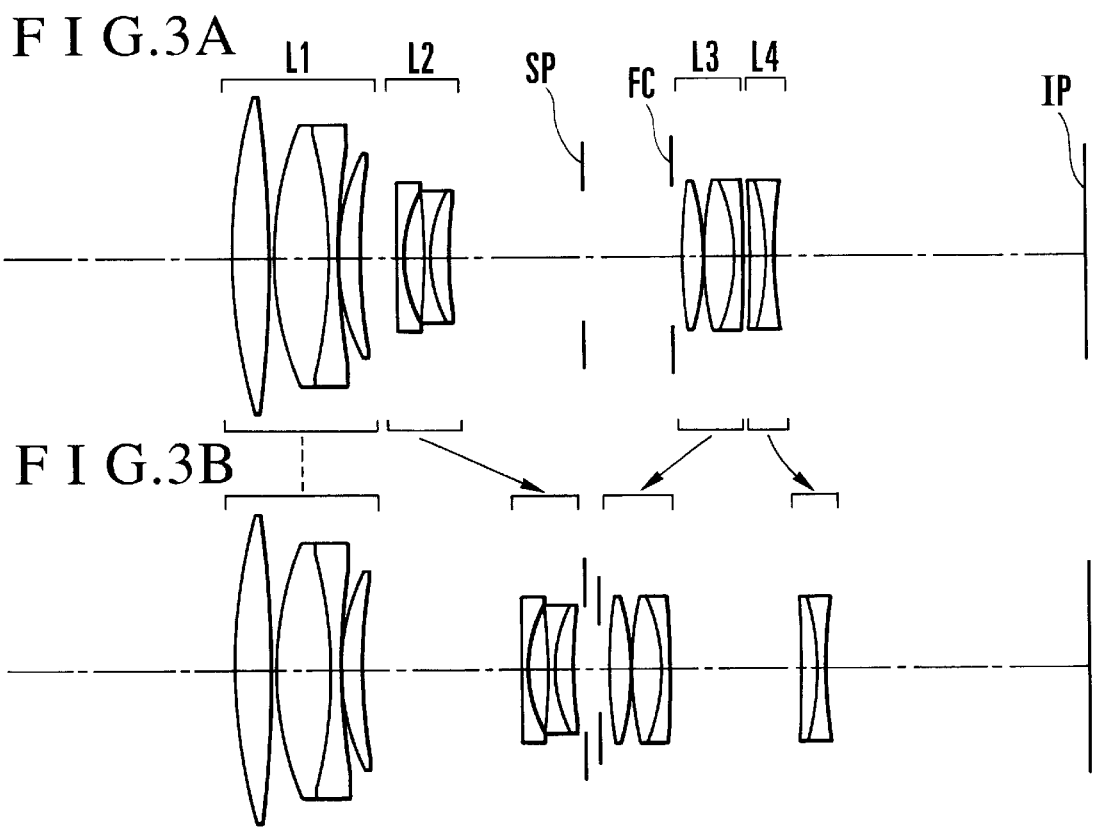
FIG.3A
FIG.3B
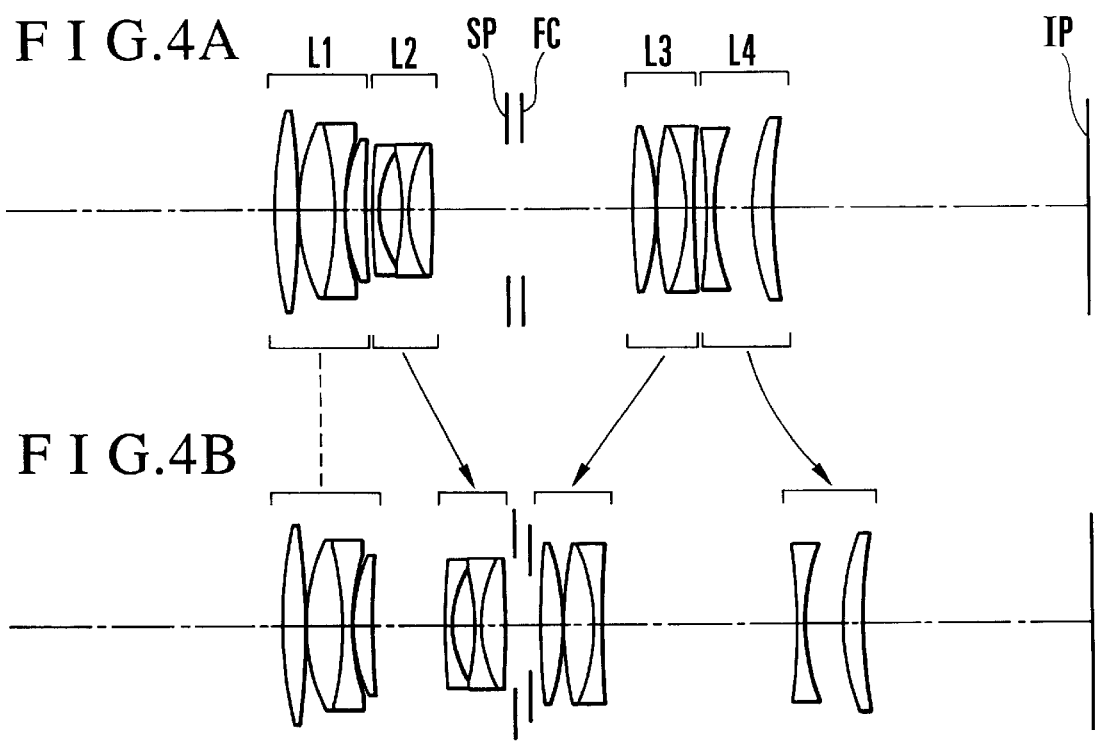
FIG.4A
FIG.4B

FIG. 6A1
FNO/2.92
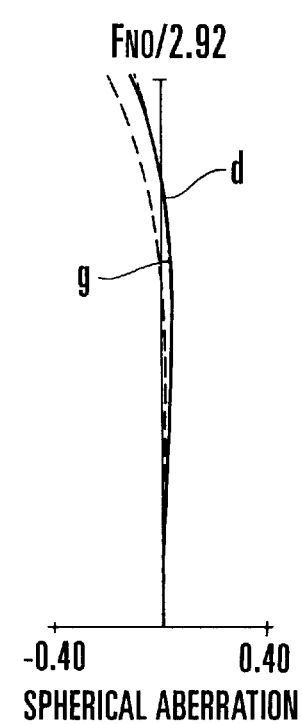
-0.40  0.40
SPHERICAL ABERRATION
FIG. 6A2
y = 21.6
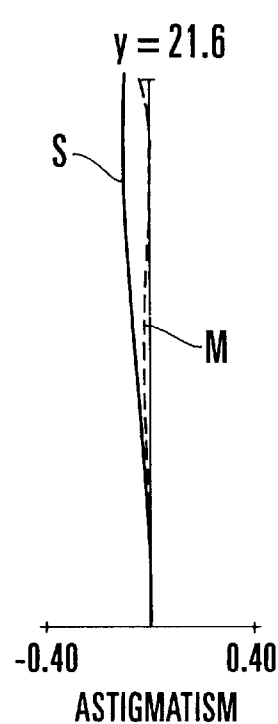
-0.40  0.40
ASTIGMATISM
FIG. 6A3
y = 21.6
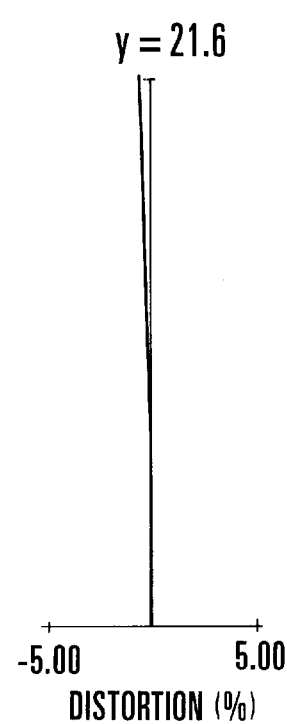
-5.00  5.00
DISTORTION (%)
FIG. 6B1
FNO/5.90
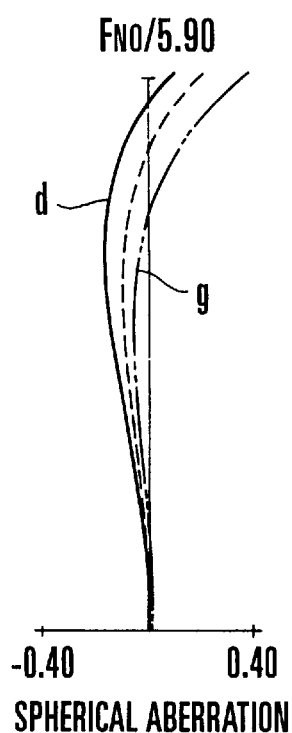
-0.40  0.40
SPHERICAL ABERRATION
FIG. 6B2
y = 21.6
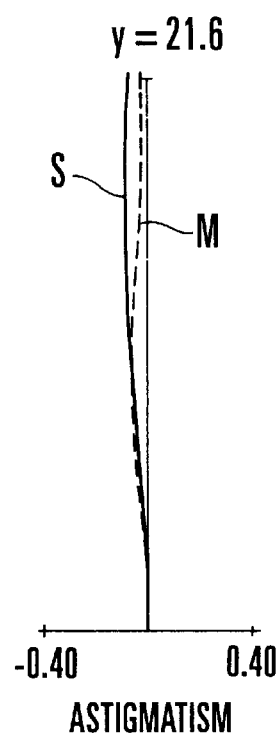
-0.40  0.40
ASTIGMATISM
FIG. 6B3
y = 21.6
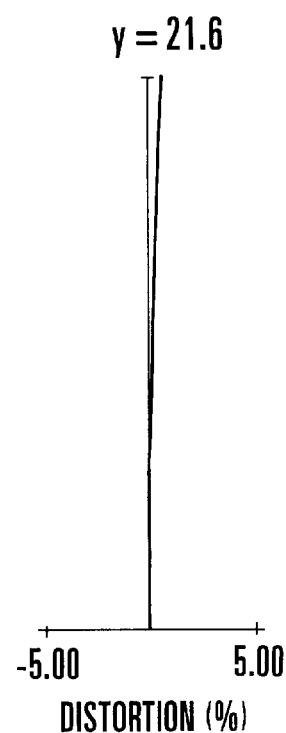
-5.00  5.00
DISTORTION (%)

FIG. 7A1
FNO/2.92
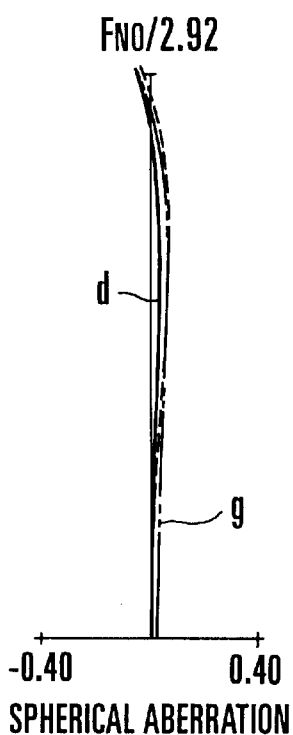
-0.40    0.40
SPHERICAL ABERRATION
FIG. 7A2
y = 21.6
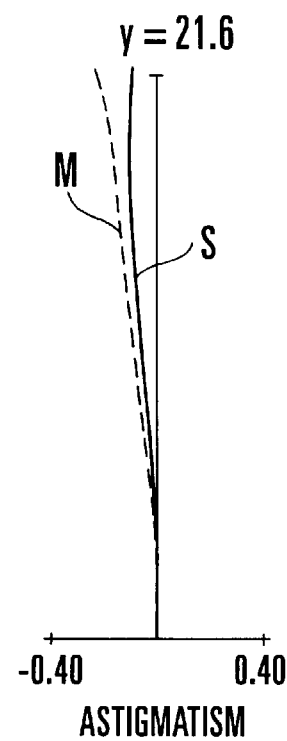
-0.40    0.40
ASTIGMATISM
FIG. 7A3
y = 21.6
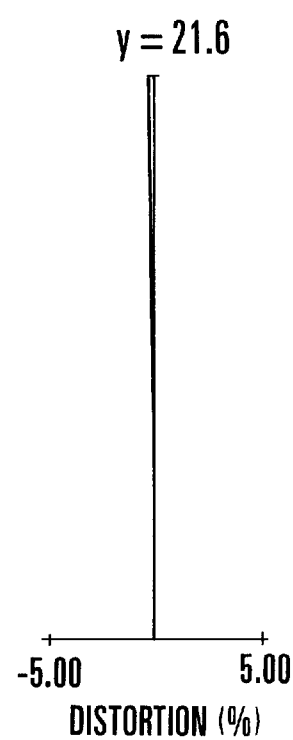
-5.00    5.00
DISTORTION (%)
FIG. 7B1
FNO/5.88
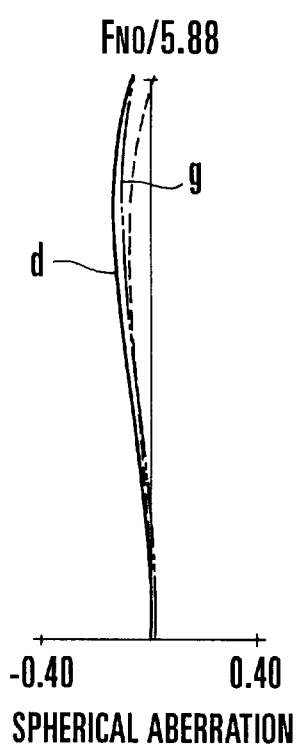
-0.40    0.40
SPHERICAL ABERRATION
FIG. 7B2
y = 21.6
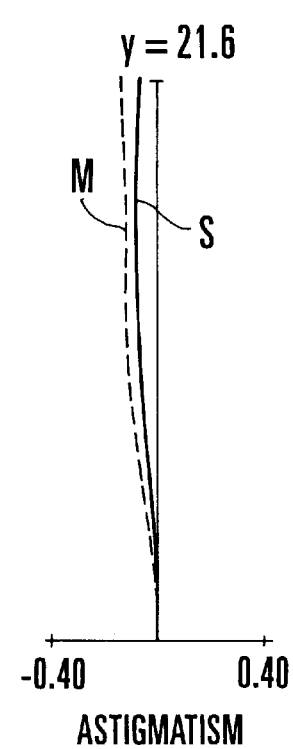
-0.40    0.40
ASTIGMATISM
FIG. 7B3
y = 21.6
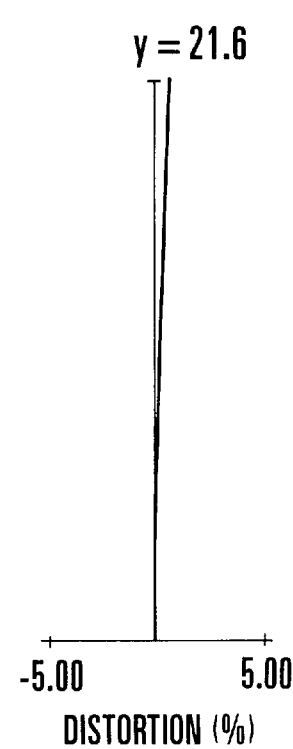
-5.00    5.00
DISTORTION (%)

FIG. 8A1
Fno/2.92
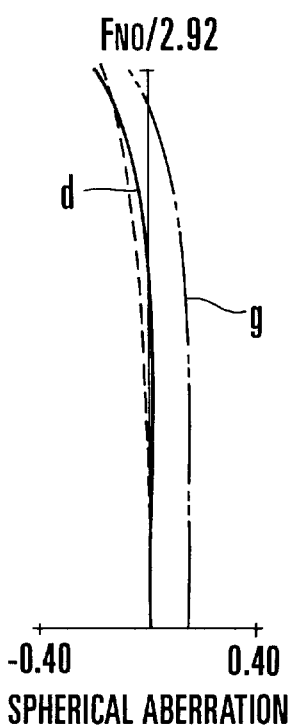
-0.40    0.40
SPHERICAL ABERRATION
FIG. 8A2
y = 21.6
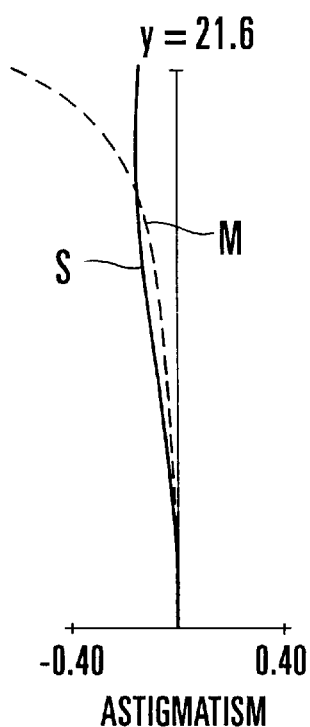
-0.40    0.40
ASTIGMATISM
FIG. 8A3
y = 21.6
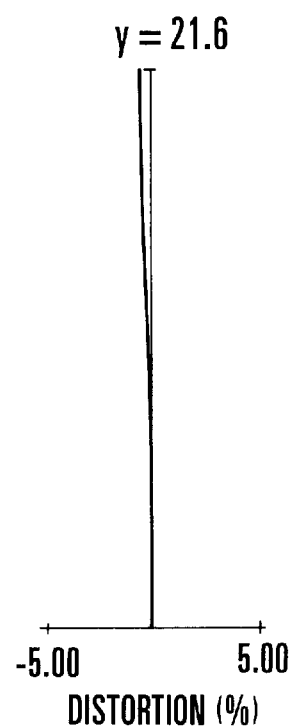
-5.00    5.00
DISTORTION (%)
FIG. 8B1
Fno/5.89
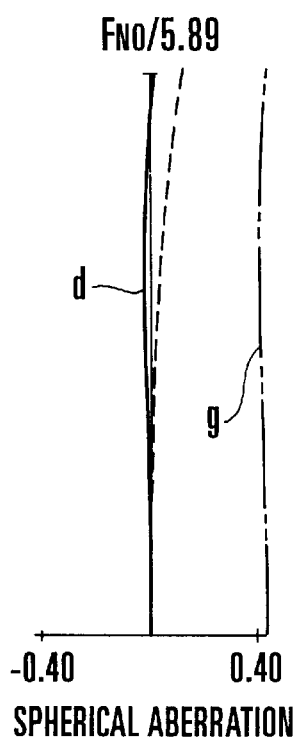
-0.40    0.40
SPHERICAL ABERRATION
FIG. 8B2
y = 21.6
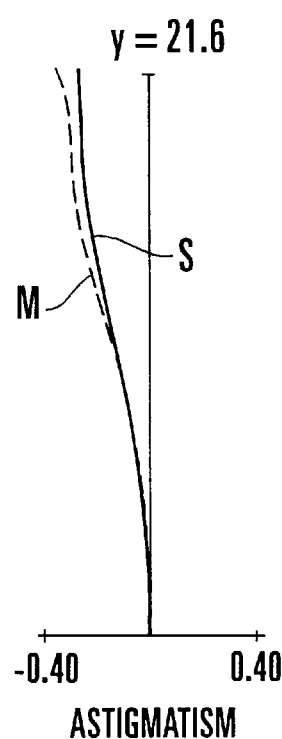
-0.40    0.40
ASTIGMATISM
FIG. 8B3
y = 21.6
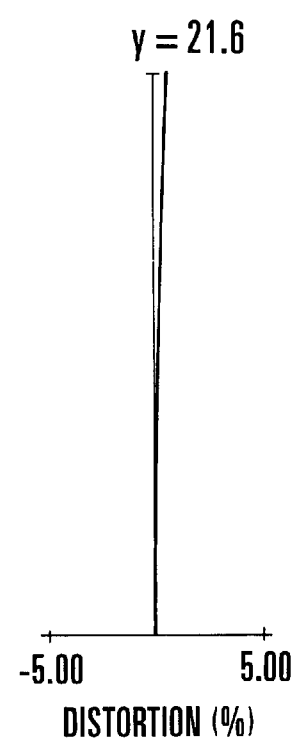
-5.00    5.00
DISTORTION (%)

FIG. 9A1
FNO/3.00
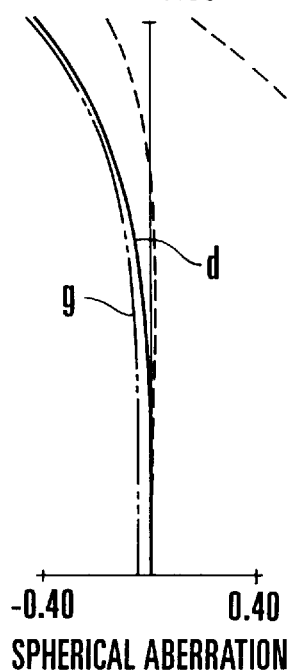
-0.40   0.40
SPHERICAL ABERRATION
FIG. 9A2
y = 21.6
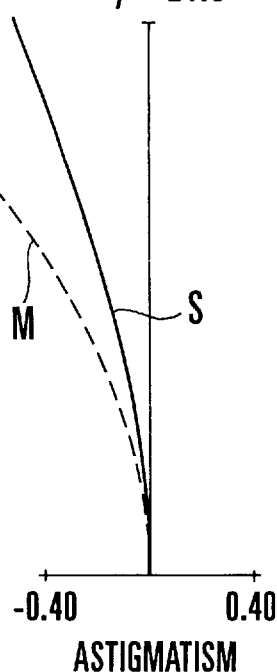
-0.40   0.40
ASTIGMATISM
FIG. 9A3
y = 21.6
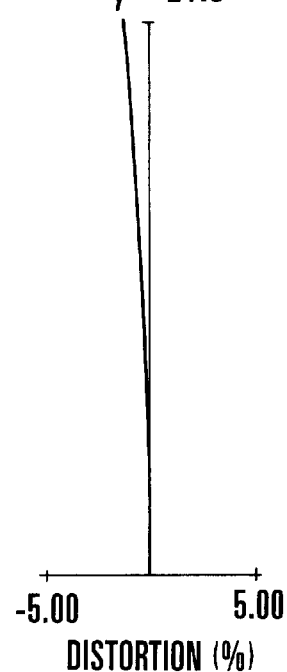
-5.00   5.00
DISTORTION (%)
FIG. 9B1
FNO/6.04
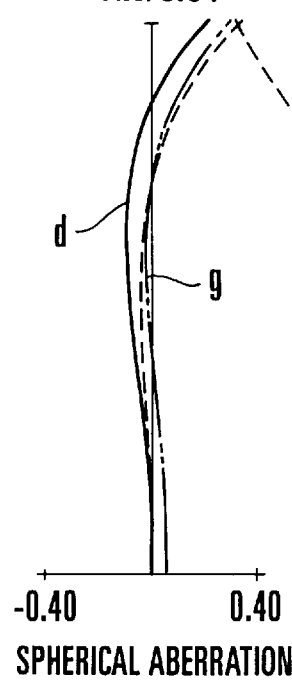
-0.40   0.40
SPHERICAL ABERRATION
FIG. 9B2
y = 21.6
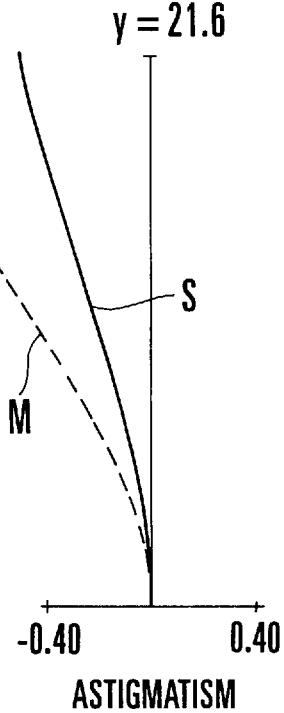
-0.40   0.40
ASTIGMATISM
FIG. 9B3
y = 21.6
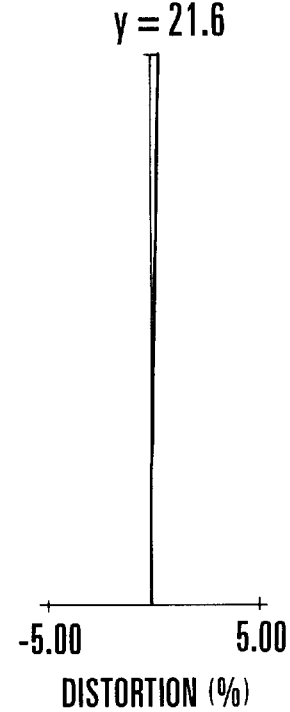
-5.00   5.00
DISTORTION (%)

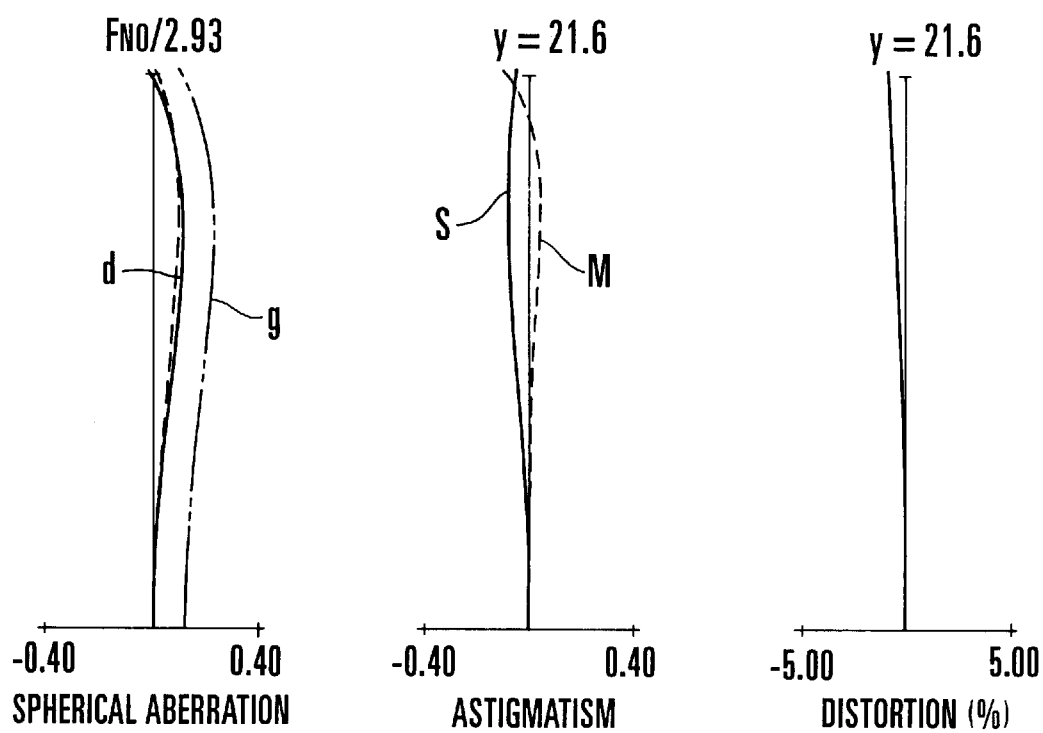
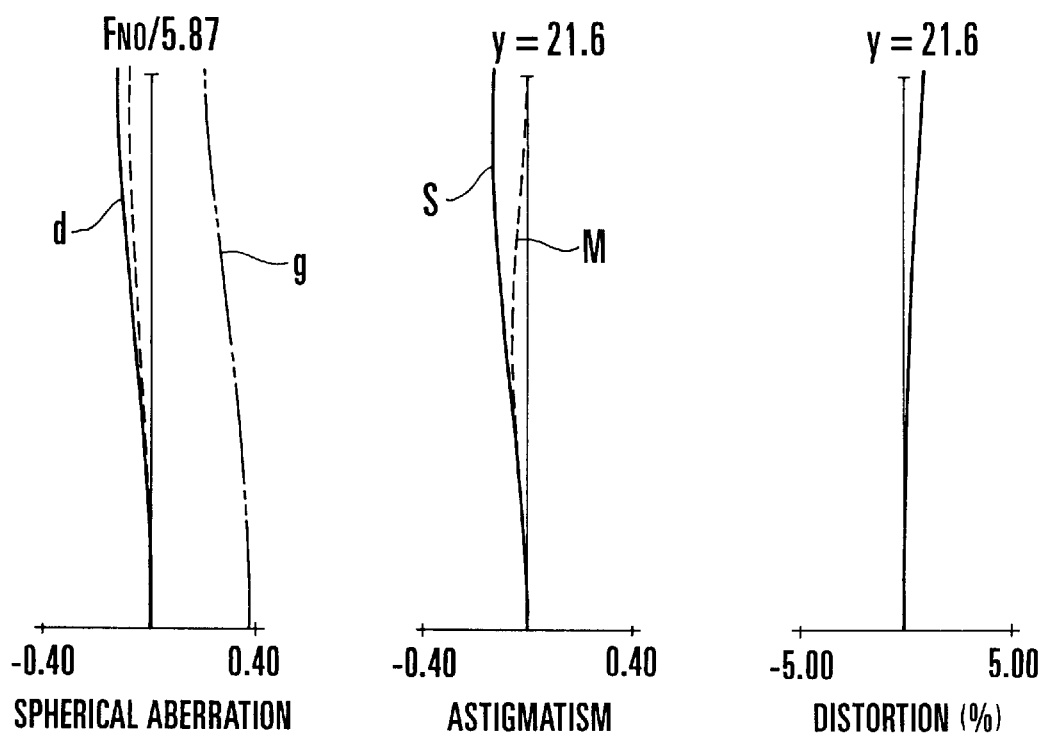

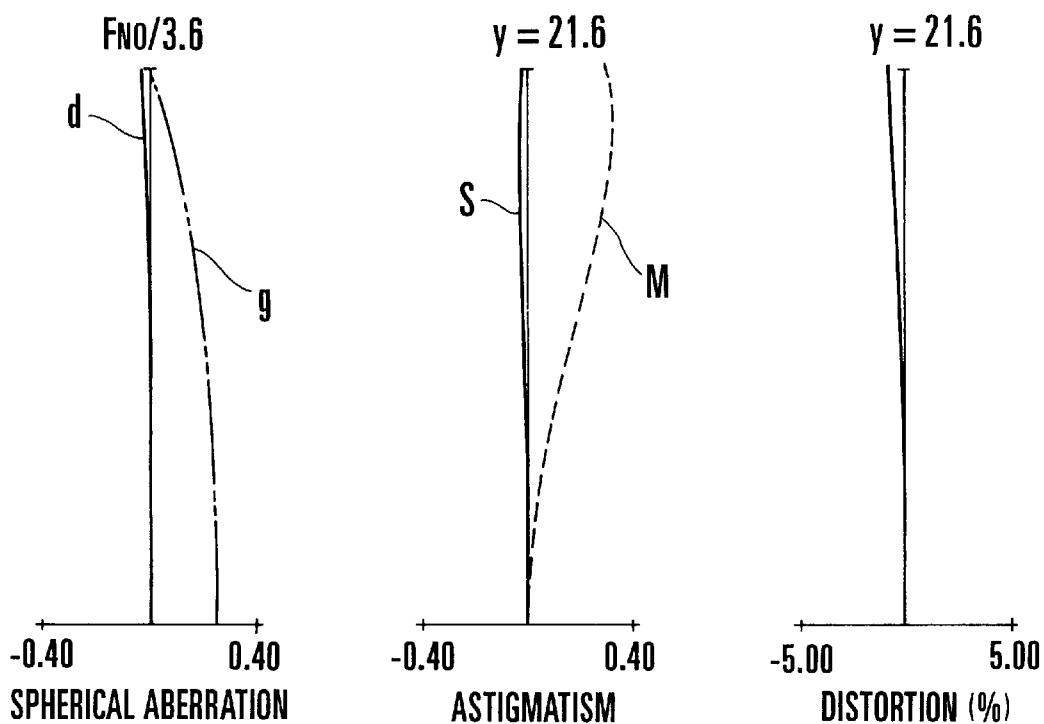
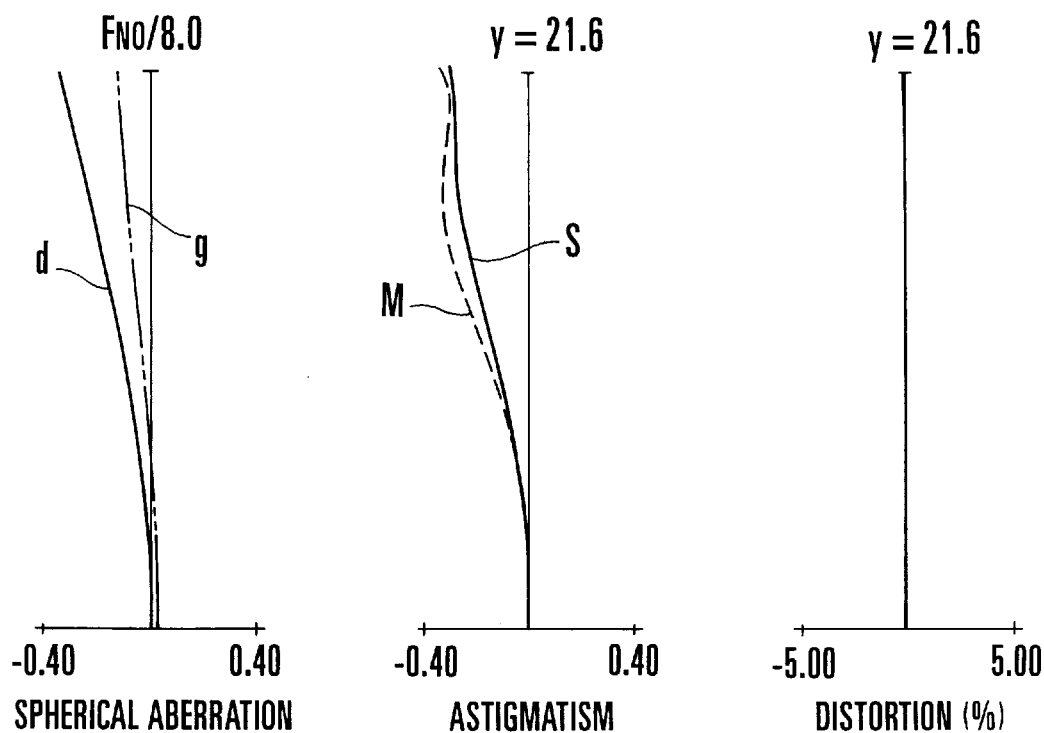

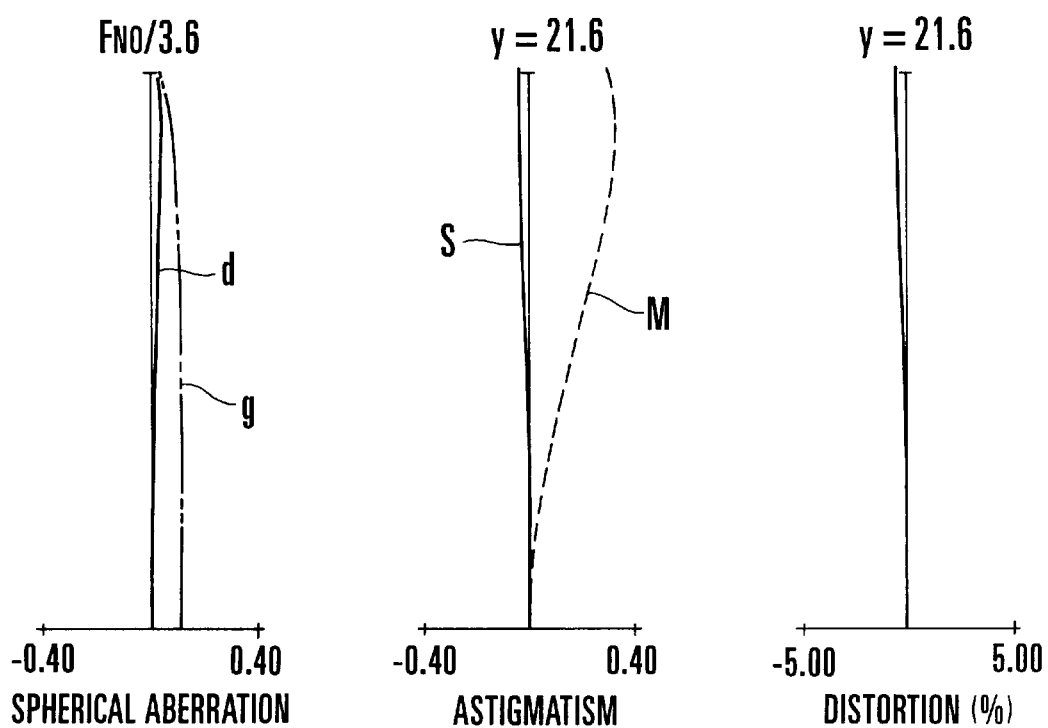
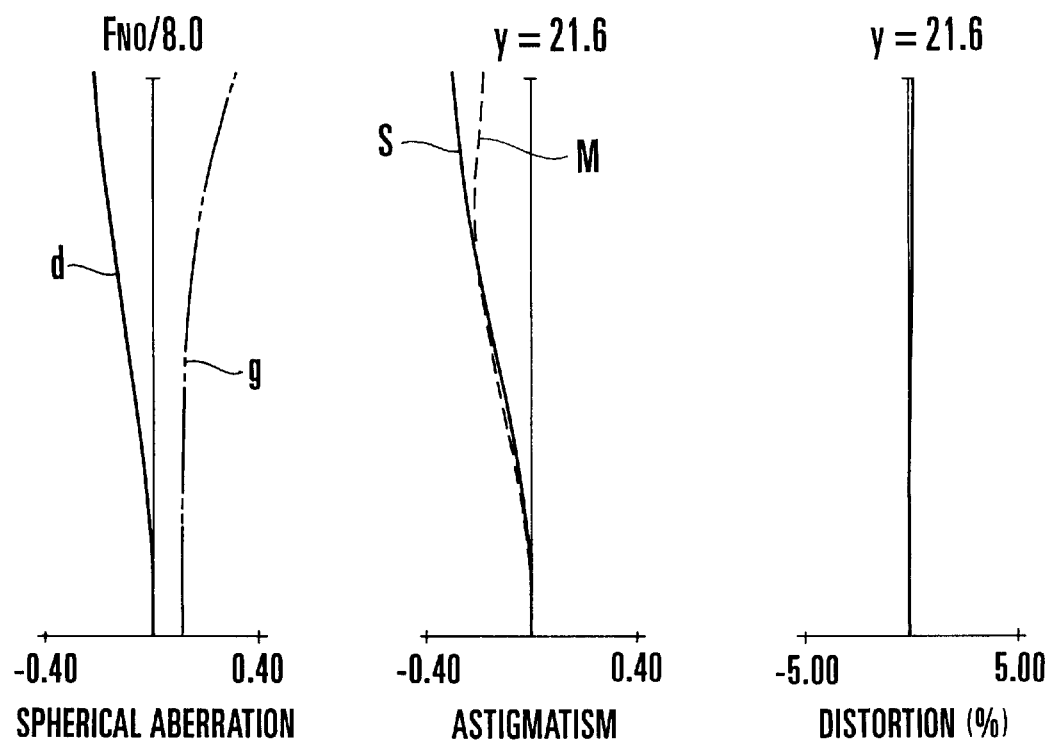

FIG. 17 A1
FNO/3.6
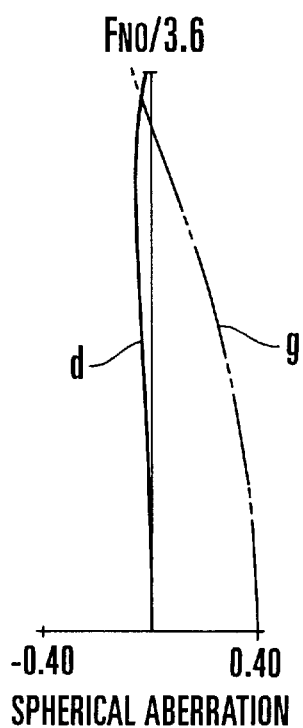
-0.40  0.40
SPHERICAL ABERRATION
FIG. 17 A2
y = 21.6
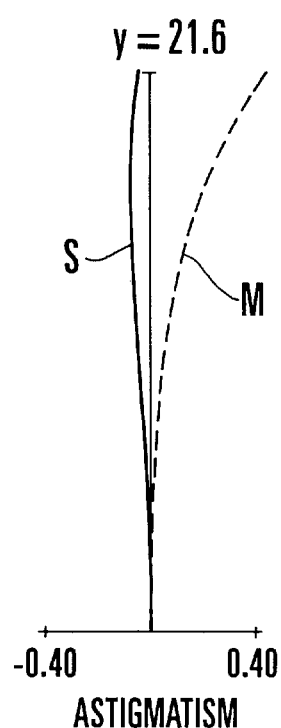
-0.40  0.40
ASTIGMATISM
FIG. 17 A3
y = 21.6
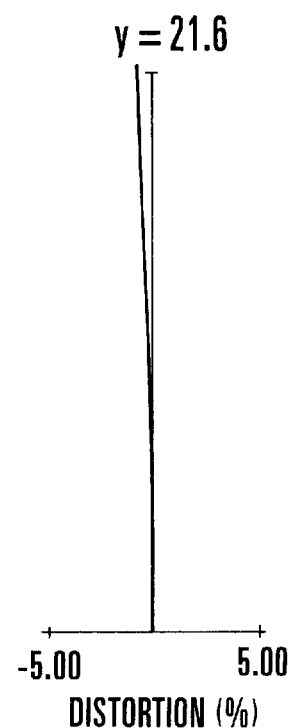
-5.00  5.00
DISTORTION (%)
FIG. 17 B1
FNO/8.0
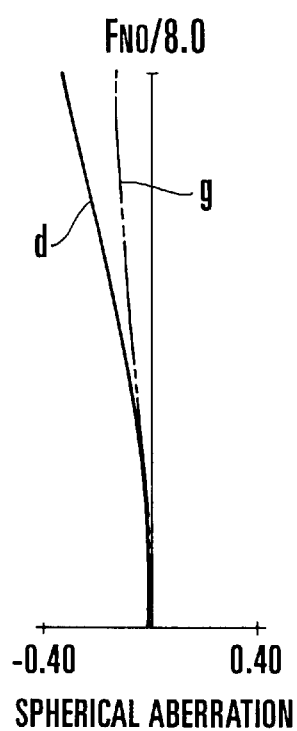
-0.40  0.40
SPHERICAL ABERRATION
FIG. 17 B2
y = 21.6
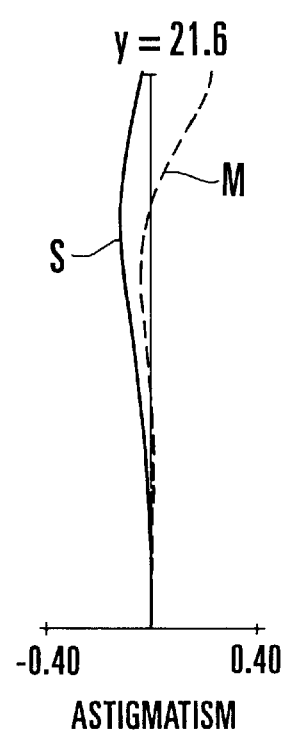
-0.40  0.40
ASTIGMATISM
FIG. 17 B3
y = 21.6
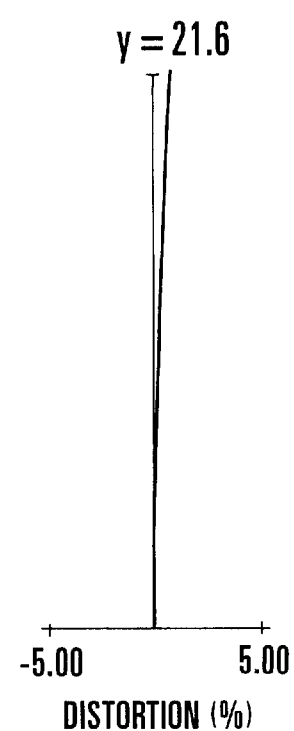
-5.00  5.00
DISTORTION (%)

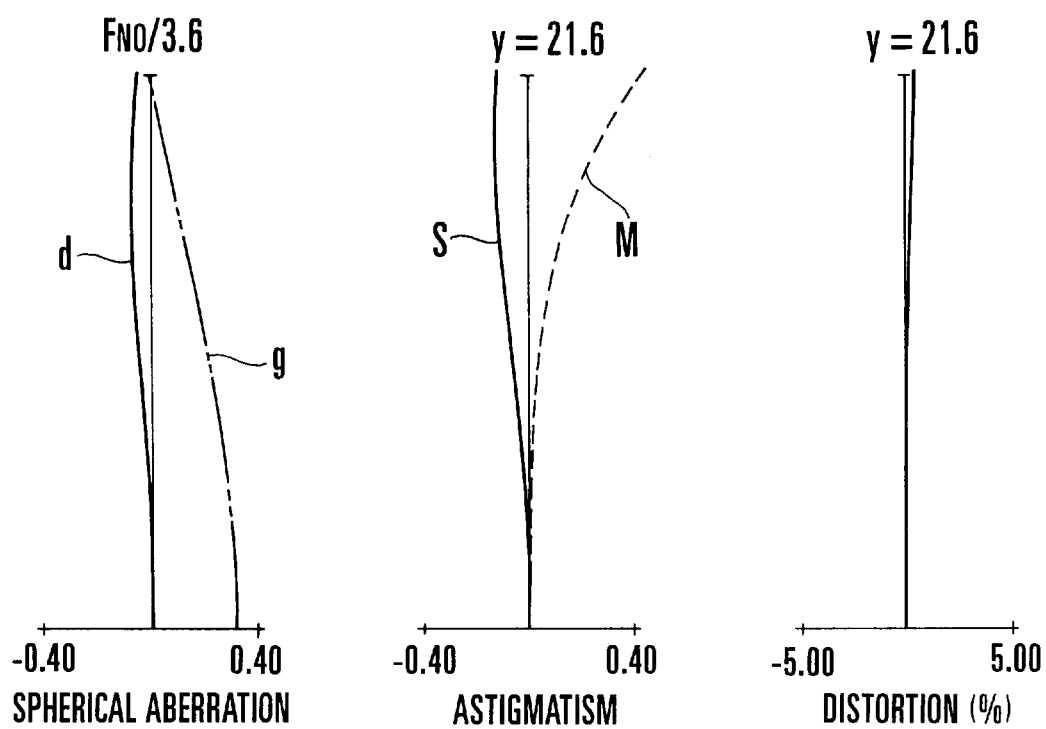
FIG. 18 A1  FIG. 18 A2  FIG. 18 A3
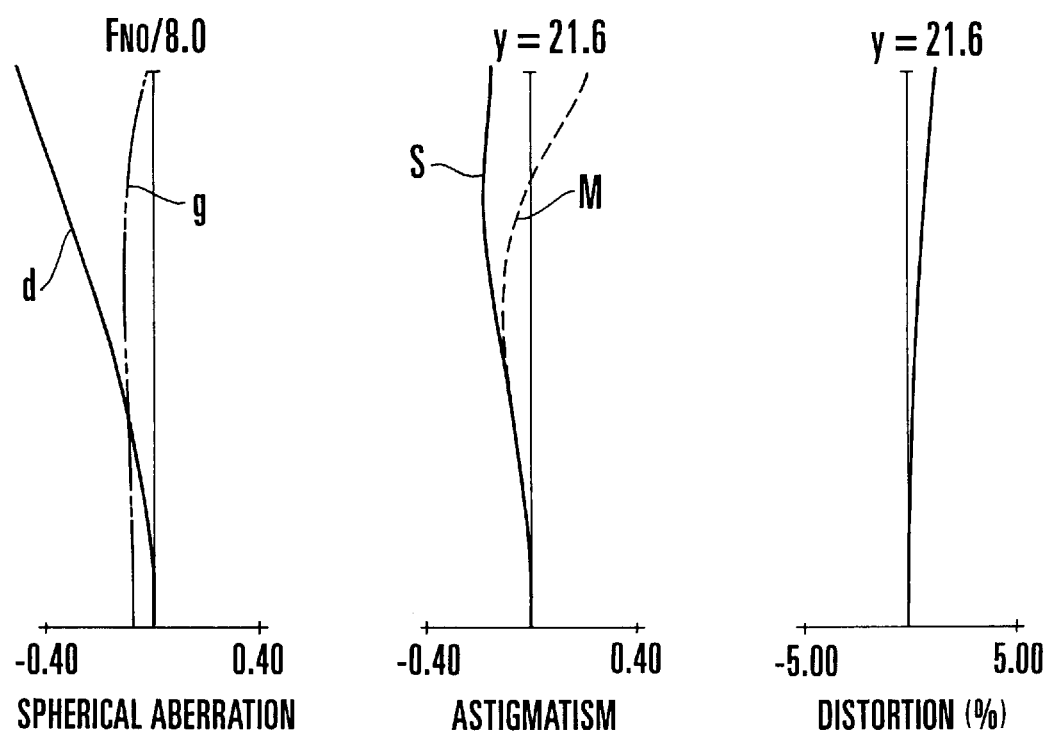
FIG. 18 B1  FIG. 18 B2  FIG. 18 B3

PHOTOGRAPHIC LENS AND PHOTOGRAPHING APPARATUS HAVING THE SAME

BACKGROUND OF THE INVENTION

1. Field of the Invention

The present invention relates to photographic lenses and photographing apparatus and, more particularly, to a photographic lens capable of focusing on an object in a wide range from infinity to as short distances with life-size magnification and a photographing apparatus having the photographic lens.

2. Description of Related Art

For a camera for photography, such as video camera or the still video camera, there has been developed a photographic lens that aims mainly at photographing close objects, or what is called the "macro" or "micro" lens (hereinafter generally referred to as the "macro" lens).

The macro lens is so designed that high optical performance is obtained when photographing an object especially at a closer distance than with other types of photographic lenses, such as the standard lens and telephoto lens in a normal image distance setting. Again, the macro lens is, in many cases, used even when shooting not only a close object but also an object in a wide range of distances from infinity to the minimum.

In general, with the macro lens, if it is intended to extend the focusing range toward shorter object distances (or the range of magnifications toward larger image sizes), aberrations vary with focusing to an even wider extent, increasing greatly particularly in closeup photography or at high reproduction ratios, and, therefore, become difficult to correct well in this region. So, as can be seen in Japanese Laid-Open Patent Application No. Sho 63-179308, a focusing method is proposed which uses at least two lens units arranged to axially move independently of each other, or utilizes the so-called "floating" technique. The of aberrations variation with focusing is thus minimized.

In the meantime, in Japanese Patent No. 2,556,986 and Japanese Laid-Open Patent Application No. Hei 4-110811, there has been proposed a photographic lens comprising, in order from an object side to an image side, a positive lens unit, a negative lens unit, a positive lens unit and a negative lens unit, wherein during focusing to closer object distances, the first and fourth lens units remain stationary relative to the image plane, the second lens unit moves toward the image side and the third lens unit moves toward the object side.

Also, in Japanese Laid-Open Patent Application No. Hei 8-76012, for the photographic lens comprising, in order from an object side to an image side, a positive lens unit, a negative lens unit, a positive lens unit and a negative lens unit, another method is proposed that, during focusing to closer object distances, the first lens unit remains stationary relative to the image plane and the second, third and fourth lens units move.

However, most of the macro lenses including that disclosed in Japanese Laid-Open Patent Application No. Sho 63-179308 employ the method of bodily moving the whole lens system forward. If a lens unit of a large size is selected to use in focusing, the driving torque of an electrically-operated control means such as a motor has to increase. In the auto-focus camera that moves the focusing lens unit by the electric motor, therefore, high-speed focusing becomes difficult to carry out.

The arrangements disclosed in the above Japanese Patent No. 2,556,986 and Japanese Laid-Open Patent Application No. Hei 4-110811, because of moving the second and third lens units of lighter weight than that of the first lens unit, are advantageous for automatic focusing. However, to assure maintenance of good stability of image quality over the entire extended focusing range from the setting for infinity to a setting for about life-size magnification, further improvements of the aberration correction must be sought for.

The arrangement disclosed in the above Japanese Laid-Open Patent Application No. Hei 8-76012 has not realized the capability of focusing up to an object of life-size magnification.

BRIEF SUMMARY OF THE INVENTION

An object of the present invention is to provide a photographic lens capable of focusing over a wide range of object distances from infinity to so close a distance that the image is magnified to life-size or thereabout, while still maintaining good stability of image quality over the entire focusing range.

To attain the above object, in accordance with an aspect of the invention, there is provided a photographic lens, which comprises, in order from an object side to an image side, a first lens unit of positive refractive power, a second lens unit of negative refractive power, a third lens unit of positive refractive power and a fourth lens unit of negative refractive power, wherein, during focusing from an infinitely distant object to a minimum-distance object, the first lens unit remains stationary, the second lens unit moves toward the image side, the third lens unit moves toward the object side and the fourth lens unit moves in such a way as to include a locus convex toward the object side.

In accordance with another aspect of the invention, there is provided a photographic lens, which comprises, in order from an object side to an image side, a first lens unit of positive refractive power, a second lens unit of negative refractive power, a third lens unit of positive refractive power, and a fourth lens unit of positive refractive power, wherein, during focusing from an infinitely distant object to a minimum-distance object, the first lens unit and the fourth lens unit remain stationary, the second lens unit moves toward the image side and the third lens unit moves toward the object side, and wherein, during a maximum photographic magnification, the separation between the second lens unit and the third lens unit is made a minimum, and the photographic lens satisfies the following conditions:

$$0.45 < f1/f < 0.6$$

$$-0.48 < f2/f < -0.29$$

$$0.76 < f3/f < 1.85,$$

where f is the focal length of the photographic lens, and f1 is the focal length of the i-th lens unit.

Further, in accordance with a further aspect of the invention, there is provided a photographing apparatus, which comprises the photographic lens described above.

These and further objects and features of the invention will become apparent from the following detailed description of preferred embodiments thereof taken in conjunction with the accompanying drawings.

BRIEF DESCRIPTION OF THE SEVERAL VIEWS OF THE DRAWING

FIGS. 3A and 3B are longitudinal section views of a numerical example 3 of the photographic lens in different operative positions.

FIGS. 4A and 4B are longitudinal section views of a numerical example 4 of the photographic lens in different operative positions.

FIGS. 6A1 to 6A3 and FIGS. 6B1 to 6B3 are graphic representations of the various aberrations of the photographic lens of the numerical example 1.

FIGS. 7A1 to 7A3 and FIGS. 7B1 to 7B3 are graphic representations of the various aberrations of the photographic lens of the numerical example 2.

FIGS. 8A1 to 8A3 and FIGS. 8B1 to 8B3 are graphic representations of the various aberrations of the photographic lens of the numerical example 3.

FIGS. 9A1 to 9A3 and FIGS. 9B1 to 9B3 are graphic representations of the various aberrations of the photographic lens of the numerical example 4.

FIGS. 10A1 to 10A3 and FIGS. 10B1 to 10B3 are graphic representations of the various aberrations of the photographic lens of the numerical example 5.

FIGS. 15A1 to 15A3 and FIGS. 15B1 to 15B3 are graphic representations of the various aberrations of the photographic lens of the numerical example 6.

FIGS. 16A1 to 16A3 and FIGS. 16B1 to 16B3 are graphic representations of the various aberrations of the photographic lens of the numerical example 7.

FIGS. 17A1 to 17A3 and FIGS. 17B1 to 17B3 are graphic representations of the various aberrations of the photographic lens of the numerical example 8.

FIGS. 18A1 to 18A3 and FIGS. 18B1 to 18B3 are graphic representations of the various aberrations of the photographic lens of the numerical example 9.

DETAILED DESCRIPTION OF THE INVENTION

Figure 1A:
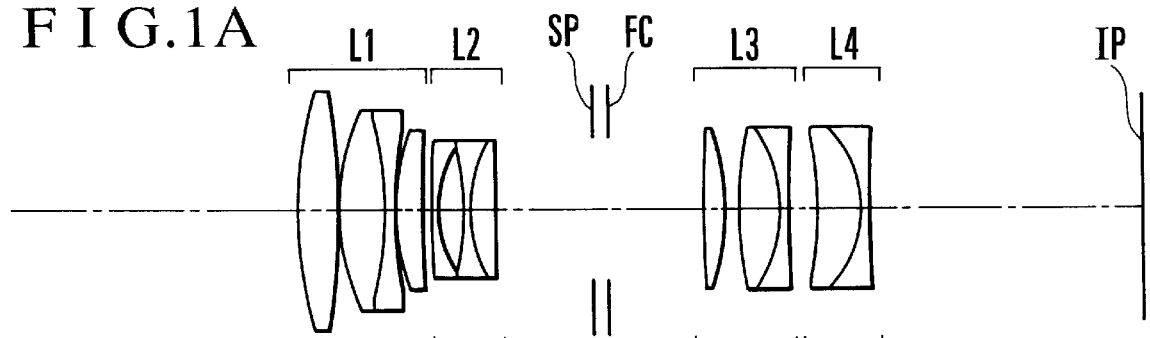
FIGS. 1A and 1B are longitudinal section views of a numerical example 1 of the photographic lens in different operative positions.
Figure 1B:
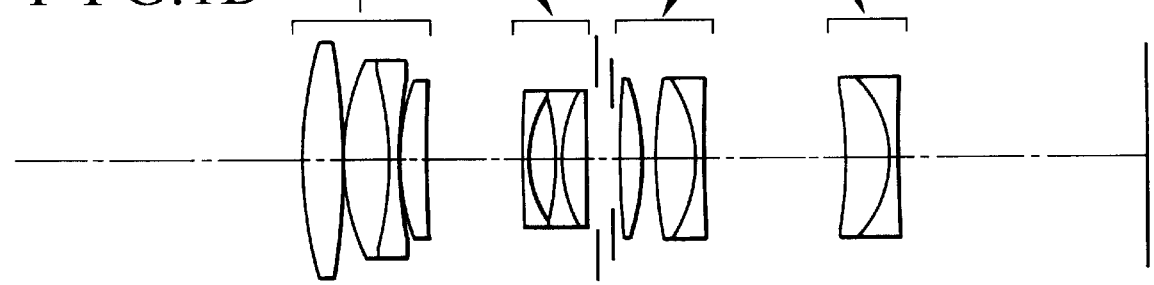
Figure 2A:
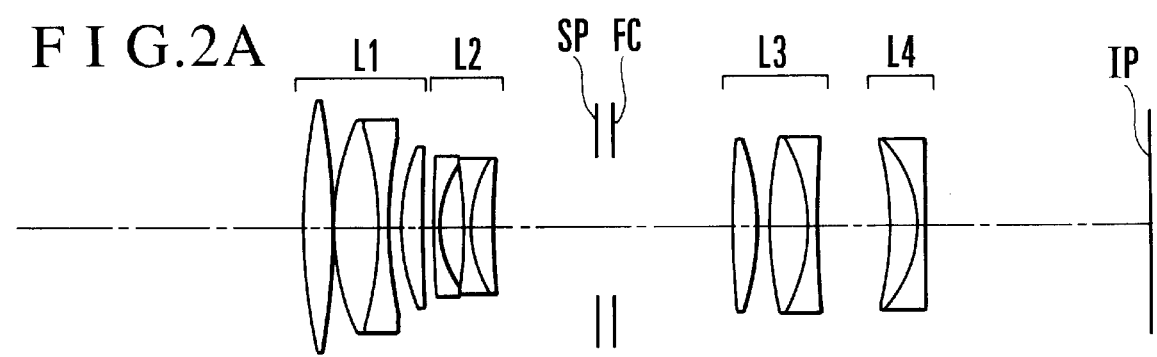
FIGS. 2A and 2B are longitudinal section views of a numerical example 2 of the photographic lens in different operative positions.
Figure 2B:
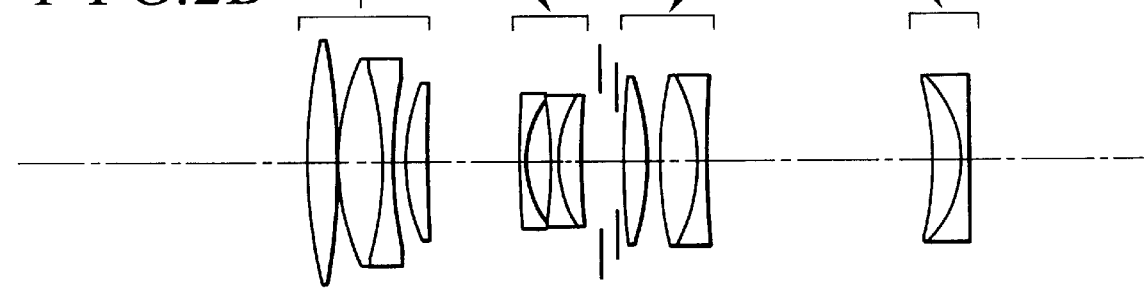
Figure 5A:
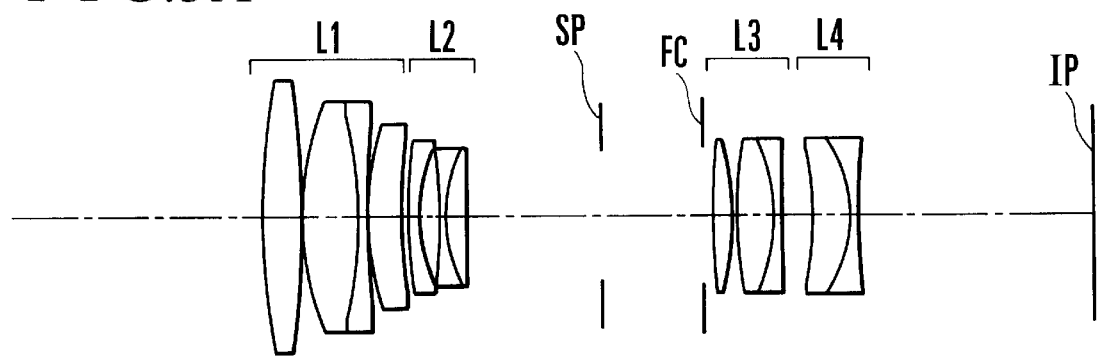
FIGS. 5A and 5B are longitudinal section views of a numerical example 5 of the photographic lens in different operative positions.
Figure 5B:
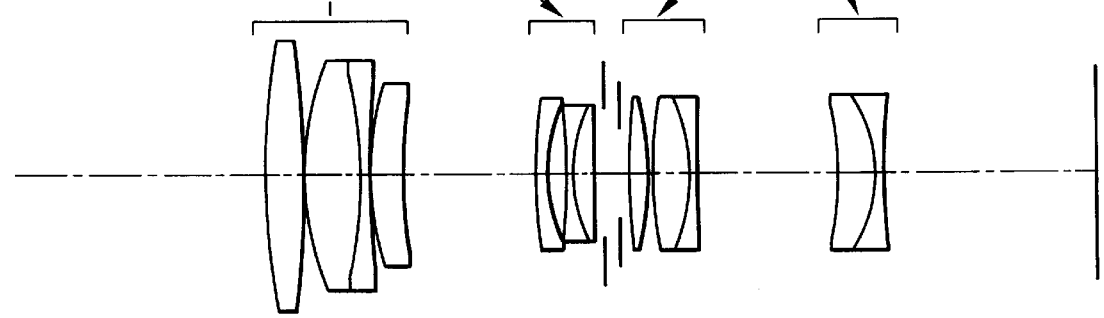
Figure 11A:
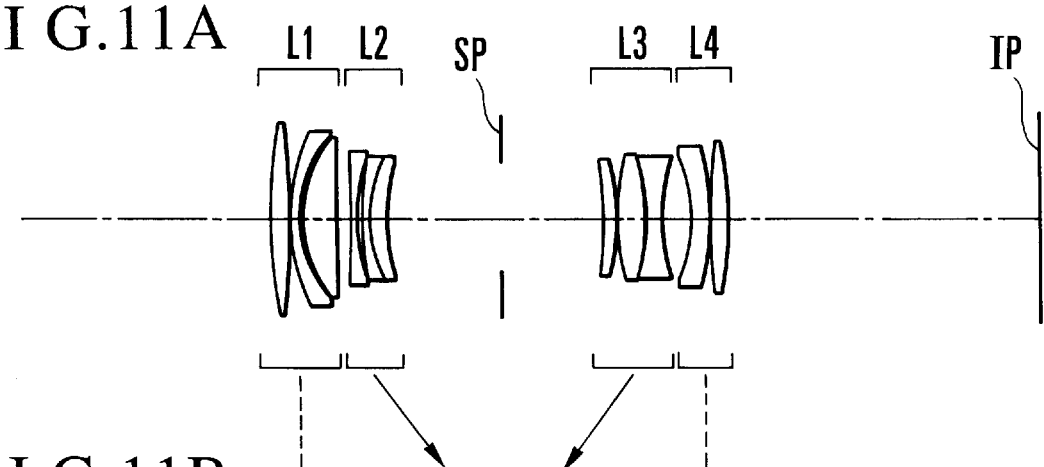
FIGS. 11A and 11B are longitudinal section views of a numerical example 6 of the photographic lens in different operative positions.
Figure 11B:
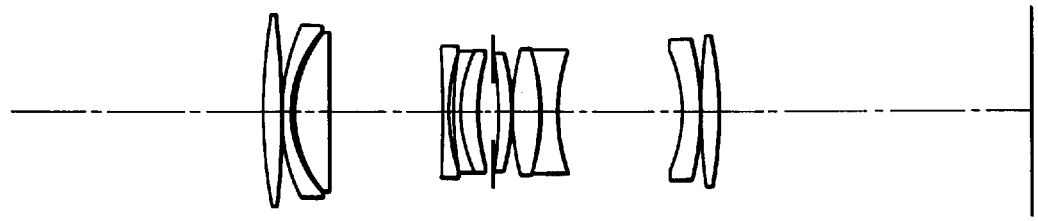
Figure 12A:
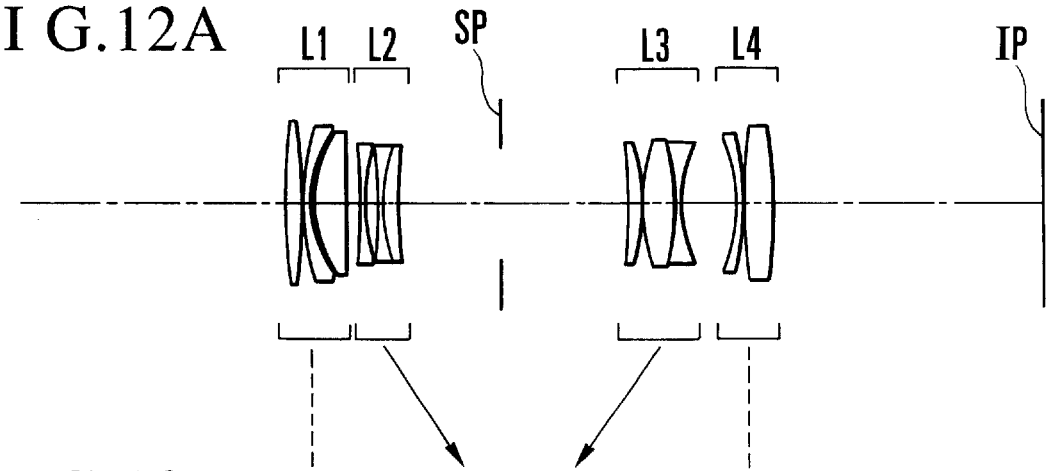
FIGS. 12A and 12B are longitudinal section views of a numerical example 7 of the photographic lens in different operative positions.
Figure 12B:
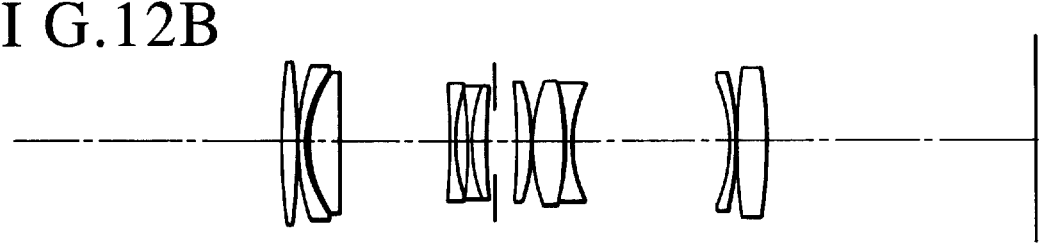
Figure 13A:
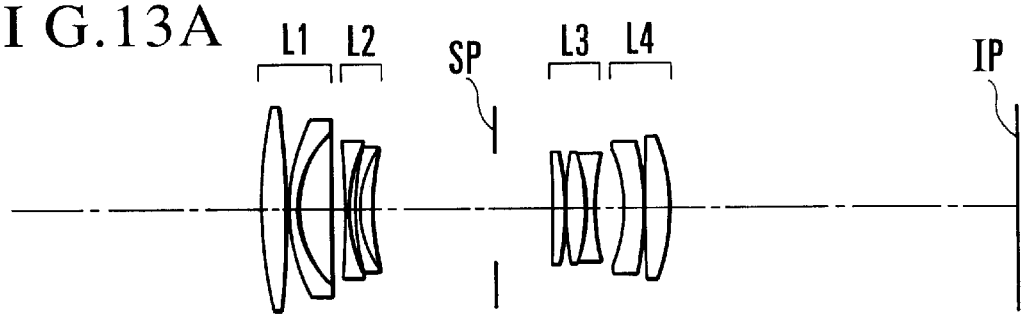
FIGS. 13A and 13B are longitudinal section views of a numerical example 8 of the photographic lens in different operative positions.
Figure 13B:
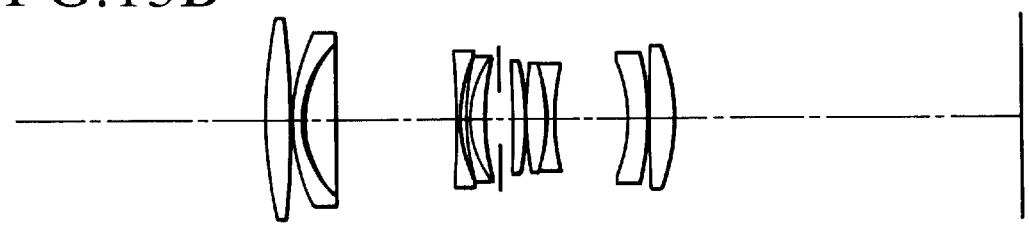
Figure 14A:
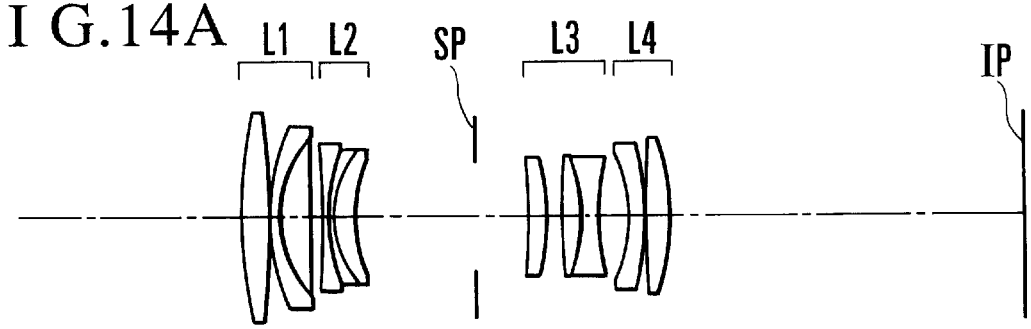
FIGS. 14A and 14B are longitudinal section views of a numerical example 9 of the photographic lens in different operative positions.
Figure 14B:
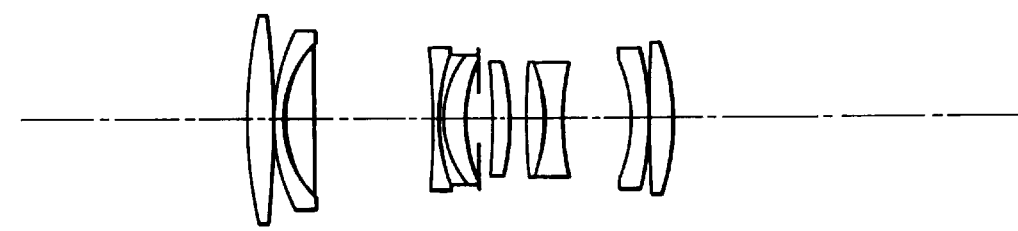

Hereinafter, preferred embodiments of the invention will be described in detail with reference to the drawings.

First Embodiment

The first embodiment is applied to the photographic lens whose angle of view is about 24° and whose aperture ratio is about 2.8 in F-number, suited to be used in a camera for photography, a video camera or a still video camera. FIGS. 1A and 1B through FIGS. 5A and 5B in block diagram show numerical examples 1 to 5 (of the first embodiment) of the photographic lens, whose data are to be described later, with FIGS. 1A to 5A in a focusing position for an infinitely distant object, and FIGS. 1B to 5B in another focusing position for a minimum-distant object (of life-size magnification).

Referring to FIGS. 1A and 1B through FIGS. 5A and 5B, the photographic lens comprises, in order from an object side to an image side, a first lens unit L1 of positive refractive power, a second lens unit L2 of negative refractive power, a third lens unit L3 of positive refractive power and a fourth lens unit L4 of negative refractive power. A stop SP (aperture stop) and a flare cut stop FC for cutting off stray light are also disposed. IP stands for an image plane on which a silver-halide film or an image pickup element is disposed.

The first lens unit L1 includes a positive lens at the frontmost position. In more detail, the first lens unit L1 is constructed with, in order from the object side, a bi-convex positive lens, a cemented lens composed of a bi-convex positive lens and a bi-concave negative lens, and a meniscus positive lens convex toward the object side.

The second lens unit L2 includes a cemented lens. In more detail, the second lens unit L2 is constructed with, in order from the object side, a negative lens (of meniscus form concave toward the image side or of bi-concave form), and a cemented lens composed of a bi-concave negative lens and a positive lens (of meniscus form convex toward the object side or of bi-convex form).

The third lens unit L3 includes a cemented lens. In more detail, the third lens unit L3 is constructed with, in order from the object side, a bi-convex positive lens, and a cemented lens composed of a bi-convex positive lens and a negative lens (of bi-concave form or of meniscus form concave toward the object side).

The fourth lens unit L4 is constructed either with a cemented lens composed of a meniscus positive lens convex toward the image side and a bi-concave lens or with, in order from the object side, a bi-concave negative lens and a meniscus positive lens convex toward the object side.

With the photographic lenses of the numerical examples 1 to 5, during focusing from an infinitely distant object to a minimum-distance object, as shown by the arrows in the figures, the first lens unit L1 remains stationary, the second lens unit L2 axially moves toward the image side, the third lens unit L3 axially moves toward the object side, and the fourth lens unit L4 moves in such a way as to include a locus convex toward the object side. Thus, the fourth lens unit L4 first moves toward the object side, as the distance decreases from infinity to a certain middle one and then moves toward the image side as the distance ever decreases from the certain middle one to a minimum. The stop SP remains stationary during focusing. In the numerical examples 1, 2 and 4, (FIGS. 1A, 1B; 2A, 2B; 4A, 4B), the flare cut stop FC remains stationary during focusing. In the numerical examples 3 and 5, (FIGS. 3A, 3B; 5A, 5B), on the other hand, the flare cut stop FC moves integrally with the third lens unit L3.

The photographic lens according to the first embodiment has an advantageous arrangement to the auto-focus in the point of lens drive, since the first lens unit L1, which is heavy, is made not to partake in focusing, while the second, third and fourth lens units L2, L3 and L4, which are relatively light in weight, are made to partake in focusing.

Another advantage arising from the multi-unit movements is that ever higher image sizes are secured, while still permitting the aberrations to be corrected easily. The second and third lens units L2 and L3, which move during focusing, contribute to a main variation of the magnification, and the fourth lens unit L4 contributes mainly to a compensation for the shift of the image plane. As the object approaches the image plane, the second lens unit L2 moves ever closer to the image plane, while the third lens unit L3 moves ever farther therefrom, thus getting much larger a range of variation of the magnification.

By such an arrangement, the first embodiment makes it possible for the photographic lens to focus on an object in a wider range of distances from infinity to a minimum distance where the image appears life-size or thereabout. Also, a good stability of the image quality is maintained throughout the entire extended focusing range.

In particular, for the first lens unit L1, a positive lens is put at the frontmost position to thereby bring the principal point much more forward, thus securing a every longer working distance. Also, the stop SP is fixed relative to the image plane during focusing, thus assuring simplification of the structure of the operating mechanism. As the stop SP takes its place at the center in between the second and third lens units L2 and L3, the light intensity is secured high enough even when shooting an object at the minimum distance (life-size magnification), and, despite the compact form, the aperture ratio is reduced, and, thus realizing a fast photographic lens. Further, the cemented surfaces of the cemented lenses included in the second and third lens units L2 and L3 can be used to suppress chromatic aberrations, which each of the second and third lens units itself has, to a minimum absolute value. The variation of aberrations with focusing is thus corrected well.

Further, for the photographic lens according to the present embodiment, it is preferred to satisfy at least one of the following conditions (1) to (6):

$$0.4 < f1/f < 0.8 \quad (1)$$

$$-0.6 < f2/f < -0.3 \quad (2)$$

$$0.3 < f3/f < 0.6 \quad (3)$$

$$-1.8 < f4/f < -0.5 \quad (4)$$

$$0.3 < \Delta s2/|\Delta s3| < 2.0 \quad (5)$$

$$1.35 < \beta 4\infty < 2.5 \quad (6)$$

where
- f: the focal length of the entire lens system,
- f1: the focal length of the first lens unit,
- f2: the focal length of the second lens unit,
- f3: the focal length of the third lens unit,
- f4: the focal length of the fourth lens unit,
- $\Delta s2$: the amount of movement of the second lens unit as focusing from an infinitely distant object to a minimum-distance object (the movement toward the image side being taken as positive),
- $\Delta s3$: the amount of movement of the third lens unit as focusing from the infinitely distant object to the minimum-distance object (the movement toward the image side being taken as positive), and
- $\beta 4\infty$: the lateral magnification of the fourth lens unit as focusing on the infinitely distant object.

The technical significance of each of the above-described conditions is explained below.

The inequalities of condition (1) are concerned with the power of the first lens unit. When the lower limit of the condition (1) is exceeded, as this means that the power of the first lens unit is too strong, it is advantageous at improving the compact form, but it becomes difficult to correct the variation of spherical aberration and chromatic aberrations during closeup focusing. Conversely, when the upper limit is exceeded, it is advantageous at correcting the aberrations, but the improved compact form is difficult to realize.

The inequalities of condition (2) are concerned with the power of the second lens unit. When the power of the second lens unit is too strong beyond the lower limit of the condition (2), the total focusing movement can be reduced, but the diverging action of the rays of light emerging from the second lens unit becomes stronger, causing the diameter of the third lens unit to increase greatly. This form is unfavorable for the auto-focus capability. Also, the aberrations of the second lens unit itself are caused to increase. So, the variation with focusing of the aberrations is difficult to correct. Conversely, when the upper limit is exceeded, it is advantageous at correcting aberrations, but the total focusing movement increases and it becomes difficult to obtain a high magnification in image size.

The inequalities of condition (3) are concerned with the power of the third lens unit. When the power of the third lens unit is too strong beyond the lower limit of the condition (3), it is advantageous at reducing total focusing movement. However, for the purpose of aberration correction, the diverging action of the second lens unit has to be made stronger. The diameter of the third lens unit is, therefore, to become too large to be unfavorable for an auto-focus capability. When the power of the third lens unit is too weak, as exceeding the upper limit, it becomes necessary for the purpose of aberration correction to weaken the negative refractive power of the second lens unit. To obtain a high magnification in image size, an ever larger space must be created for both of the second and third lens units.

The inequalities of condition (4) are concerned with the power of the fourth lens unit. When the power of the fourth lens unit is too weak below the lower limit of the condition (4), the required movement of the fourth lens unit for compensating for the image shift increases greatly, which in turn, causes a great increase of the total length of the complete lens system. So, the violation to the lower limit of the condition (4) is harmful for improving the compact form. When the power of the fourth lens unit is too strong beyond the upper limit, it is advantageous at the point of the moving space, but the aberrations which the fourth lens unit itself produces are increased too much to correct easily.

The inequalities of condition (5) are concerned with the amounts of movement of the second and third lens units during focusing. When the lower limit of the condition (5) is exceeded, as this implies that the second lens unit moves too much slower than the third lens unit, the power of the second lens unit has to increase. If so, the diverging component becomes stronger. Also, because the third lens unit moves too long, the diameter of the third lens unit has to increase. Otherwise, satisfactory illumination in the corners of the image frame could not be maintained stable over the entire focusing range. When the upper limit is exceeded, as this implies that the second lens unit moves too much faster than the third lens unit, the power of the third lens unit has to increase and the power of the second lens unit has to decrease. If so, it becomes difficult to cancel the aberrations which the second and third lens units produce.

The inequalities of condition (6) are concerned with the lateral magnification of the fourth lens unit in the focusing position for an infinitely distant object. When the lateral magnification of the fourth lens unit is below the lower limit, the other lens units have to take ever larger shares of the variation of the magnification. Therefore, a much greater increase of the power of each lens unit results. So, it becomes difficult to correct aberrations. When the lateral magnification of the fourth lens unit becomes higher than the upper limit, the other lens units take a lesser burden of varying the magnification, but the fourth lens unit itself has to increase either in power or in movement. So, the violation to the upper limit of the condition (6) is harmful for correcting aberrations and for improving the compact form of the camera.

Next, five numerical examples 1 to 5 of the photographic lens are shown with their numerical data in tables, where f, FNo and 2ω are respectively the focal length, the F-number and the field angle of the entire lens system, ri is the radius of curvature of the i-th lens surface, when counted from the object side, di is the i-th axial lens thickness or air separation, when counted from the object side, and ni and vi are respectively the refractive index and Abbe number of the material of the i-th lens element, when counted from the object side.

The various aberrations of the photographic lenses of the numerical examples 1 to 5 are shown in FIGS. 6A1 to 6A3 and FIGS. 6B1 to 6B3 through FIGS. 10A1 to 10A3 and FIGS. 10B1 to 10B3, respectively. During focusing on an infinitely distant object, the photographic lenses of the numerical examples 1 to 5 have the aberrations shown in FIGS. 6A1 to 6A3 through FIGS. 10A1 to 10A3, respectively. During focusing on a minimum-distance object, the photographic lenses of the numerical examples 1 to 5 produce aberrations shown in FIGS. 6B1 to 6B3 and FIGS. 10B1 to 10B3, respectively. In each of the aberrations curves, d stands for the spectral d-line, g stands for the spectral g-line, S stands for the sagittal image surface, and M stands for the meridional image surface.

The values of the factors in the above-described conditions (1) to (6) for the numerical examples 1 to 5 are listed in Table-1.

| Variable | Magnification | |
|---|---|---|
| Separation | 1/∞ | 1.0x |
| d7 | 1.62 | 18.34 |
| d12 | 18.82 | 2.11 |
| d14 | 18.09 | 1.46 |
| d19 | 5.55 | 26.92 |

Numerical Example 2:
f = 99.28500   FNo = 1:2.92   2ω = 24.6°

| r1 = 105.169 | d1 = 6.00 | n1 = 1.69680 | v1 = 55.5 |
| r2 = −149.623 | d2 = 0.15 | | |
| r3 = 51.976 | d3 = 8.40 | n2 = 1.48749 | v2 = 70.2 |
| r4 = −70.895 | d4 = 1.85 | n3 = 1.80100 | v3 = 35.0 |
| r5 = 95.267 | d5 = 2.46 | | |
| r6 = 41.227 | d6 = 4.00 | n4 = 1.48749 | v4 = 70.2 |
| r7 = 299.407 | d7 = Variable | | |
| r8 = 267.999 | d8 = 1.40 | n5 = 1.74950 | v5 = 35.3 |
| r9 = 23.490 | d9 = 4.62 | | |
| r10 = −94.702 | d10 = 1.40 | n6 = 1.51823 | v6 = 58.9 |
| r11 = 25.494 | d11 = 4.10 | n7 = 1.84666 | v7 = 23.9 |
| r12 = 145.551 | d12 = Variable | | |
| r13 = Stop | d13 = 3.00 | | |
| r14 = Flare Cut Stop | d14 = Variable | | |
| r15 = 211.204 | d15 = 4.50 | n8 = 1.69680 | v8 = 55.5 |
| r16 = −56.780 | d16 = 2.46 | | |
| r17 = 78.338 | d17 = 7.30 | n9 = 1.77250 | v9 = 49.6 |
| r18 = −35.719 | d18 = 1.60 | n10 = 1.80518 | v10 = 25.4 |
| r19 = 239.680 | d19 = Variable | | |
| r20 = −69.659 | d20 = 5.40 | n11 = 1.84666 | v11 = 23.9 |
| r21 = −23.632 | d21 = 1.60 | n12 = 1.83400 | v12 = 37.2 |
| r22 = 9837.627 | | | |

| Variable | Magnification | |
|---|---|---|
| Separation | 1/∞ | 1.0x |
| d7 | 2.08 | 17.86 |
| d12 | 19.69 | 3.92 |
| d14 | 22.90 | 1.08 |
| d19 | 13.92 | 43.07 |

Numerical Example 1:
f = 98.81071   FNo = 1:2.92   2ω = 24.8°

| r1 = 80.310 | d1 = 7.72 | n1 = 1.60311 | v1 = 60.6 |
| r2 = −142.343 | d2 = 0.15 | | |
| r3 = 46.979 | d3 = 8.60 | n2 = 1.48749 | v2 = 70.2 |
| r4 = −70.360 | d4 = 1.85 | n3 = 1.83400 | v3 = 37.2 |
| r5 = 93.869 | d5 = 0.15 | | |
| r6 = 46.984 | d6 = 5.02 | n4 = 1.48749 | v4 = 70.2 |
| r7 = 376.053 | d7 = Variable | | |
| r8 = 257.987 | d8 = 1.40 | n5 = 1.74950 | v5 = 35.3 |
| r9 = 22.692 | d9 = 4.80 | | |
| r10 = −61.296 | d10 = 1.40 | n6 = 1.51742 | v6 = 52.4 |
| r11 = 26.680 | d11 = 4.49 | n7 = 1.84666 | v7 = 23.8 |
| r12 = 425.160 | d12 = Variable | | |
| r13 = Stop | d13 = 3.00 | | |
| r14 = Flare Cut Stop | d14 = Variable | | |
| r15 = 202.342 | d15 = 4.14 | n8 = 1.69680 | v8 = 55.5 |
| r16 = −50.157 | d16 = 2.71 | | |
| r17 = 77.498 | d17 = 7.71 | n9 = 1.77250 | v9 = 49.6 |
| r18 = −28.063 | d18 = 1.60 | n10 = 1.80518 | v10 = 25.4 |
| r19 = 418.310 | d19 = Variable | | |
| r20 = −74.490 | d20 = 8.28 | n11 = 1.84666 | v11 = 23.8 |
| r21 = −21.527 | d21 = 1.60 | n12 = 1.83400 | v12 = 37.2 |
| r22 = 323.565 | | | |

Numerical Example 3:
f = 98.50087   FNo = 1:2.92   2ω = 24.8°

| r1 = 119.631 | d1 = 7.18 | n1 = 1.88300 | v1 = 40.8 |
| r2 = −273.254 | d2 = 1.00 | | |
| r3 = 69.606 | d3 = 11.00 | n2 = 1.51633 | v2 = 64.2 |
| r4 = −96.950 | d4 = 1.85 | n3 = 1.84666 | v3 = 23.8 |
| r5 = 156.063 | d5 = 0.15 | | |
| r6 = 50.531 | d6 = 3.88 | n4 = 1.48749 | v4 = 70.2 |
| r7 = 112.817 | d7 = Variable | | |
| r8 = −2140.877 | d8 = 1.40 | n5 = 1.83400 | v5 = 37.2 |
| r9 = 28.677 | d9 = 3.89 | | |
| r10 = −161.691 | d10 = 1.40 | n6 = 1.48749 | v6 = 70.2 |
| r11 = 27.643 | d11 = 3.66 | n7 = 1.84666 | v7 = 23.8 |
| r12 = 103.835 | d12 = Variable | | |
| r13 = Stop | d13 = Variable | | |
| r14 = Flare Cut Stop | d14 = 2.00 | | |
| r15 = 100.853 | d15 = 4.23 | n8 = 1.77250 | v8 = 49.6 |
| r16 = −59.930 | d16 = 0.15 | | |
| r17 = 71.073 | d17 = 6.13 | n9 = 1.62299 | v9 = 58.2 |
| r18 = −39.461 | d18 = 1.60 | n10 = 1.84666 | v10 = 23.8 |
| r19 = −270.033 | d19 = Variable | | |

-continued

Numerical Example 3:
f = 98.50087   FNo = 1:2.92   2ω = 24.8°

| | | | |
|---|---|---|---|
| r20 = −242.021 | d20 = 3.41 | n11 = 1.84666 | ν11 = 23.8 |
| r21 = −55.404 | d21 = 1.60 | n12 = 1.88300 | ν12 = 40.8 |
| r22 = 100.310 | | | |

| Variable Separation | Magnification | |
|---|---|---|
| | 1/∞ | 1.0x |
| d7 | 7.44 | 31.81 |
| d12 | 26.74 | 2.37 |
| d13 | 17.96 | 3.00 |
| d19 | 1.24 | 26.19 |

Numerical Example 4:
f = 96.13712   FNo = 1:3.00   2ω = 25.6°

| | | | |
|---|---|---|---|
| r1 = 88.438 | d1 = 4.77 | n1 = 1.72000 | ν1 = 50.2 |
| r2 = −160.259 | d2 = 0.15 | | |
| r3 = 43.221 | d3 = 7.07 | n2 = 1.60311 | ν2 = 60.6 |
| r4 = −69.483 | d4 = 1.85 | n3 = 1.83400 | ν3 = 37.2 |
| r5 = 49.632 | d5 = 0.15 | | |
| r6 = 35.848 | d6 = 3.88 | n4 = 1.48749 | ν4 = 70.2 |
| r7 = 201.975 | d7 = Variable | | |
| r8 = 198.020 | d8 = 1.40 | n5 = 1.83400 | ν5 = 37.2 |
| r9 = 23.882 | d9 = 4.44 | | |
| r10 = −53.595 | d10 = 1.40 | n6 = 1.57501 | ν6 = 41.5 |
| r11 = 27.476 | d11 = 4.76 | n7 = 1.84666 | ν7 = 23.8 |
| r12 = −311.683 | d12 = Variable | | |
| r13 = Stop | d13 = 3.00 | | |
| r14 = Flare Cut Stop | d14 = Variable | | |
| r15 = 158.614 | d15 = 4.62 | n8 = 1.72000 | ν8 = 50.2 |
| r16 = −53.275 | d16 = 0.15 | | |
| r17 = 82.442 | d17 = 6.12 | n9 = 1.72000 | ν9 = 50.2 |
| r18 = −40.673 | d18 = 1.60 | n10 = 1.84666 | ν10 = 23.8 |
| r19 = 292.580 | d19 = Variable | | |
| r20 = −126.255 | d20 = 1.60 | n11 = 1.51742 | ν11 = 52.4 |
| r21 = 43.373 | d21 = 7.69 | | |
| r22 = 52.547 | d22 = 4.00 | n12 = 1.84666 | ν12 = 23.8 |
| r23 = 105.827 | | | |

| Variable Separation | Magnification | |
|---|---|---|
| | 1/∞ | 1.0x |
| d7 | 1.43 | 14.49 |
| d12 | 15.06 | 2.00 |
| d14 | 22.06 | 2.00 |
| d19 | 2.34 | 38.91 |

Numerical Example 5:
f = 98.49525   FNo = 1:2.93   2ω = 25.0°

| | | | |
|---|---|---|---|
| r1 = 145.080 | d1 = 8.00 | n1 = 1.83481 | ν1 = 42.7 |
| r2 = −205.760 | d2 = 0.15 | | |
| r3 = 64.055 | d3 = 10.88 | n2 = 1.48749 | ν2 = 70.2 |
| r4 = −94.710 | d4 = 1.85 | n3 = 1.84666 | ν3 = 23.8 |
| r5 = 198.582 | d5 = 0.15 | | |
| r6 = 63.990 | d6 = 6.68 | n4 = 1.69680 | ν4 = 55.5 |
| r7 = 138.703 | d7 = Variable | | |

-continued

Numerical Example 5:
f = 98.49525   FNo = 1:2.93   2ω = 25.0°

| | | | |
|---|---|---|---|
| r8 = −1054.871 | d8 = 1.40 | n5 = 1.83400 | ν5 = 37.2 |
| r9 = 34.688 | d9 = 3.71 | | |
| r10 = −137.068 | d10 = 1.40 | n6 = 1.62374 | ν6 = 47.1 |
| r11 = 30.936 | d11 = 4.08 | n7 = 1.84666 | ν7 = 23.8 |
| r12 = 1236.408 | d12 = Variable | | |
| r13 = Stop | d13 = Variable | | |
| r14 = Flare Cut Stop | d14 = 2.00 | | |
| r15 = 162.754 | d15 = 3.84 | n8 = 1.80400 | ν8 = 46.6 |
| r16 = −63.028 | d16 = 0.62 | | |
| r17 = 78.877 | d17 = 7.62 | n9 = 1.69680 | ν9 = 55.5 |
| r18 = −38.424 | d18 = 1.60 | n10 = 1.80518 | ν10 = 25.4 |
| r19 = 703.729 | d19 = Variable | | |
| r20 = −75.640 | d20 = 7.55 | n11 = 1.80518 | ν11 = 25.4 |
| r21 = −27.518 | d21 = 1.60 | n12 = 1.72342 | ν12 = 38.0 |
| r22 = 157.829 | | | |

| Variable Separation | Magnification | |
|---|---|---|
| | 1/∞ | 1.0x |
| d7 | 2.15 | 27.14 |
| d12 | 27.01 | 2.03 |
| d13 | 20.20 | 3.20 |
| d19 | 6.11 | 27.99 |

TABLE 1

| Condition Factor | Numerical Example | | | | |
|---|---|---|---|---|---|
| | 1 | 2 | 3 | 4 | 5 |
| f1/f | 0.572 | 0.564 | 0.680 | 0.549 | 0.650 |
| f2/f | −0.367 | −0.369 | −0.368 | −0.370 | −0.450 |
| f3/f | 0.420 | 0.473 | 0.381 | 0.485 | 0.445 |
| f4/f | −0.751 | −0.862 | −0.778 | −1.491 | −0.821 |
| Δs2/|Δs3| | 1.005 | 0.723 | 1.629 | 0.651 | 1.470 |
| β4∞ | 1.766 | 1.545 | 1.821 | 1.556 | 1.635 |

Second Embodiment

Another embodiment of the invention is described as applied to the photographic lens whose field angle is about 24° and whose aperture ratio is about 3.5 in F-number, suited to a camera for photography, a video camera, or a video still camera.

FIGS. 11A and 11B to FIGS. 14A and 14B in block diagram show numerical examples 6 to 9 of the second embodiment whose numerical data will be described later. FIGS. 15A1 to 15A3 and FIGS. 15B1 to 15B3 through FIGS. 18A1 to 18A3 and FIGS. 18B1 to 18B3 graphically show the various aberrations of the photographic lenses of numerical examples 6 to 9, respectively.

Of the block diagrams and graphs, the ones whose figure numbers are suffixed 'A' are in a focusing position for an infinitely distant object, and the others whose figure numbers are suffixed 'B' are in another focusing position for a minimum-distance object (of unity magnification in image size).

Referring to FIGS. 11A and 11B to FIGS. 14A and 14B, the photographic lens comprises, in order from an object side to an image side, a first lens unit L1 of positive refractive power, a second lens unit L2 of negative refractive power, a third lens unit L3 of positive refractive power and a fourth lens unit L4 of positive refractive power. A stop SP is disposed in a space between the second and third lens units L2 and L3. IP stands for an image plane.

During focusing from an infinitely distant object to a minimum-distance object, the first and fourth lens units L1 and L4 remain stationary, and the second and third lens units L2 and L3 axially move toward the image side and toward the object side, respectively. At the maximum magnification in image size (unity magnification), the separation between the second and third lens units L2 and L3 is made a minimum.

In the second embodiment, not only the above-described rules of lens design, but also additional rules for the refractive powers of the first to third lens units are set forth to thereby minimize the variation of aberrations with variation of the magnification of the image on the film. So, for an infinitely distant object and a minimum-distance object, or any object in a wide range of distances, good correction of aberrations is made possible. In particular, as focusing goes from the normal range to the closeup range, good stability of aberration correction can be maintained.

The additional rules mentioned above are expressed by the following conditions:

$$0.45 < f1/f < 0.6 \quad (7)$$

$$-0.48 < f2/f < -0.29 \quad (8)$$

$$0.76 < f3/f < 1.85 \quad (9)$$

where f: the focal length of the entire lens system,
f1: the focal length of the first lens unit,
f2: the focal length of the second lens unit, and
f3: the focal length of the third lens unit.

The technical significance of each of the above-described conditions (7) to (9) is explained below.

The inequalities of condition (7) are concerned with the refractive power of the first lens unit. When the lower limit of the condition (7) is exceeded, as this means that the refractive power of the first lens unit is too strong, the lens system is advantageously formed to a compact size, but the variation with focusing of spherical aberration and chromatic aberrations becomes difficult to correct.

Conversely, when the upper limit is exceeded, it is advantageous at correcting the aberrations, but the lens system as a whole becomes difficult to minimize in size.

The inequalities of condition (8) are concerned with the power of the second lens unit. When the power of the second lens unit is too strong as exceeding the lower limit of the condition (8), the total focusing movement can be reduced, but the rays of light emerging from the second lens unit diverges greatly. To admit of this, the third lens unit has to take a large diameter unfavorable for the auto-focus capability.

Also, the aberrations of the second lens unit itself are caused to increase. So, the variation with focusing of the aberrations becomes difficult to correct. Conversely, when the upper limit is exceeded, it is advantageous at correcting the aberrations, but the total focusing movement increases and it becomes difficult to obtain a high magnification in image size.

The inequalities of condition (9) are concerned with the power of the third lens unit. When the power of the third lens unit is too strong beyond the lower limit of the condition (9), it is advantageous at reducing the total focusing movement.

However, for the purpose of aberration correction, the diverging action of the second lens unit has to be made stronger. The diameter of the third lens unit is, therefore, caused to increase. When the power of the third lens unit is too weak, as exceeding the upper limit, it becomes necessary for the purpose of aberration correction to weaken the negative power of the second lens unit. To obtain a high magnification in image size, therefore, the moving space increases objectionably.

The features or conditions described above suffice for accomplishing the aim of providing a floating-type photographic lens of the second embodiment. To further reduce the variation of aberrations with focusing in the closeup range and to obtain a high optical performance throughout the entire range of object distances, it is still preferred to satisfy at least one of the following features or conditions.

(a1) During focusing from an infinitely distant object to a minimum-distance object, the amounts of movement $\Delta s2$ and $\Delta s3$ of the second and third lens units, respectively, lie within the following range:

$$0.43 < \Delta s2/|\Delta s3| < 2.98 \quad (10)$$

where the amount of movement toward the image side is taken as positive and the amount of movement toward the object side is taken as negative.

The inequalities of condition (10) are concerned with the balance of the focusing movements of the second and third lens units. It is to be noted that the amount of movement toward the image side is taken as positive and the amount of movement toward the object side is taken as negative. When the lower limit of the condition (10) is exceeded, as this implies that the second lens unit moves too much longer than the third lens unit, the movement of the third lens unit can be correspondingly decreased and the height of incidence of the axial beam on the fourth lens unit in closeup photography can be increased. These are advantageous at correcting spherical aberration, but the second lens unit has to take an increased share of the variation of the magnification. Therefore, it becomes necessary for the second lens unit to have an ever larger power in the absolute value. From the point of view of aberration correction, it is disadvantageous.

(a2) The stop is arranged in the space between the second and third lens units to remain stationary during focusing.

Because the stop does not change its position during focusing, the operating mechanism can be simplified in structure. Also, as the position of the stop is taken at the center in the space between the second and third lens units, a sufficient light amount is secured even at the time of life-size photography. Moreover, despite the compact form, the aperture ratio is made small to realize a fast photographic lens.

(a3) The second lens unit has a cemented lens composed of a negative lens and a positive lens.

By the inclusion of the cemented adjoining surfaces of the negative and positive lenses in the second lens unit, the absolute values of the chromatic aberrations, which the second lens unit itself has, can be suppressed to a minimum, thus correcting well the variation of aberrations with focusing.

(a4) The first lens unit is composed of a positive lens-of bi-convex form, a negative lens of meniscus form convex toward the object side and a positive lens of meniscus form convex toward the object side.

(a5) The second lens unit is composed of a negative lens of bi-concave form, a negative lens of meniscus form convex toward the object side and a positive lens of meniscus form convex toward the object side.

(a6) The third lens unit is composed of a positive lens of meniscus form convex toward the image side, a positive lens of bi-convex form and a negative lens of bi-concave form.

(a7) The fourth lens unit is composed of a negative lens of meniscus form convex toward the image side and a positive lens of bi-convex form.

With the form and the construction and arrangement of the constituent lenses as in the conditions (a4) to (a7), the variation of aberration with focusing is minimized to correct all the aberrations in good balance over the entire range of object distances.

Next, four numerical examples 6 to 9 are shown with their numerical data in tables below. The values of the factors in the above-described conditions (7) to (10) for the numerical examples 6 to 9 are listed in Table-2.

Numerical Example 6:
f = 100.0    FNo = 1:3.5    2ω = 24.4°

| r1 = 110.810 | d1 = 3.92 | n1 = 1.64000 | ν1 = 60.1 |
|---|---|---|---|
| r2 = −199.157 | d2 = 0.10 | | |
| r3 = 41.882 | d3 = 1.87 | n2 = 1.80518 | ν2 = 25.4 |
| r4 = 24.928 | d4 = 0.58 | | |
| r5 = 25.365 | d5 = 7.00 | n3 = 1.64250 | ν3 = 58.4 |
| r6 = 324.383 | d6 = Variable | | |
| r7 = −217.441 | d7 = 1.20 | n4 = 1.81554 | ν4 = 44.4 |
| r8 = 42.461 | d8 = 1.26 | | |
| r9 = 94.675 | d9 = 1.20 | n5 = 1.62041 | ν5 = 60.3 |
| r10 = 24.672 | d10 = 3.85 | n6 = 1.84666 | ν6 = 23.8 |
| r11 = 46.121 | d11 = Variable | | |
| r12 = Stop | d12 = Variable | | |
| r13 = −96.958 | d13 = 3.00 | n7 = 1.74400 | ν7 = 44.8 |
| r14 = −45.359 | d14 = 0.10 | | |
| r15 = 48.636 | d15 = 6.28 | n8 = 1.74400 | ν8 = 44.8 |
| r16 = −37.075 | d16 = 0.10 | | |
| r17 = −36.187 | d17 = 3.27 | n9 = 1.67270 | ν9 = 32.1 |
| r18 = 35.195 | d18 = Variable | | |
| r19 = −32.224 | d19 = 4.05 | n10 = 1.88300 | ν10 = 40.8 |
| r20 = −55.438 | d20 = 0.15 | | |
| r21 = 149.632 | d21 = 3.78 | n11 = 1.80300 | ν11 = 46.7 |
| r22 = −79.849 | | | |

| Variable | Magnification | | |
|---|---|---|---|
| Separation | 1/∞ | 0.5 | 1.0 |
| d6 | 3.000 | 14.072 | 23.705 |
| d11 | 23.696 | 12.610 | 3.000 |
| d12 | 21.181 | 9.706 | 1.000 |
| d18 | 6.140 | 17.619 | 26.321 |

Numerical Example 7:
f = 100.0    FNo = 1:3.6    2ω = 24.4°

| r1 = 122.257 | d1 = 3.34 | n1 = 1.60311 | ν1 = 60.7 |
|---|---|---|---|
| r2 = −176.527 | d2 = 0.10 | | |
| r3 = 47.907 | d3 = 1.52 | n2 = 1.80518 | ν2 = 25.4 |
| r4 = 25.369 | d4 = 0.86 | | |
| r5 = 26.095 | d5 = 6.44 | n3 = 1.67790 | ν3 = 55.3 |
| r6 = 1030.958 | d6 = Variable | | |
| r7 = −179.096 | d7 = 1.20 | n4 = 1.81554 | ν4 = 44.4 |
| r8 = 44.569 | d8 = 2.33 | | |
| r9 = −4713.562 | d9 = 1.20 | n5 = 1.62041 | ν5 = 60.3 |
| r10 = 34.350 | d10 = 3.30 | n6 = 1.84666 | ν6 = 23.8 |
| r11 = 129.691 | d11 = Variable | | |
| r12 = Stop | d12 = Variable | | |
| r13 = −151.066 | d13 = 3.00 | n7 = 1.74400 | ν7 = 44.8 |
| r14 = −49.607 | d14 = 0.10 | | |
| r15 = 34.756 | d15 = 7.20 | n8 = 1.74400 | ν8 = 44.8 |
| r16 = −49.328 | d16 = 0.10 | | |
| r17 = −47.984 | d17 = 1.20 | n9 = 1.67270 | ν9 = 32.1 |
| r18 = 27.217 | d18 = Variable | | |
| r19 = −34.203 | d19 = 1.20 | n10 = 1.88300 | ν10 = 40.8 |
| r20 = −64.514 | d20 = 0.15 | | |
| r21 = 132.410 | d21 = 6.26 | n11 = 1.80300 | ν11 = 46.7 |
| r22 = −118.235 | | | |

| Variable | Magnification | | |
|---|---|---|---|
| Separation | 1/∞ | 0.5 | 1.0 |
| d6 | 2.991 | 13.545 | 22.894 |
| d11 | 21.473 | 10.920 | 1.571 |
| d12 | 26.651 | 14.791 | 4.774 |
| d18 | 11.902 | 23.763 | 33.780 |

Numerical Example 8:
f = 100.0    FNo = 1:3.6    2ω = 24.4°

| r1 = 98.669 | d1 = 5.24 | n1 = 1.61772 | ν1 = 49.8 |
|---|---|---|---|
| r2 = −234.939 | d2 = 1.05 | | |
| r3 = 40.807 | d3 = 1.49 | n2 = 1.75084 | ν2 = 27.7 |
| r4 = 21.566 | d4 = 0.14 | | |
| r5 = 21.590 | d5 = 7.18 | n3 = 1.62041 | ν3 = 60.3 |
| r6 = 569.791 | d6 = Variable | | |
| r7 = −176.203 | d7 = 0.90 | n4 = 1.71700 | ν4 = 47.9 |
| r8 = 31.118 | d8 = 1.27 | | |
| r9 = 63.089 | d9 = 0.90 | n5 = 1.62041 | ν5 = 60.3 |
| r10 = 20.099 | d10 = 3.15 | n6 = 1.75520 | ν6 = 27.5 |
| r11 = 47.015 | d11 = Variable | | |
| r12 = Stop | d12 = Variable | | |
| r13 = −202.584 | d13 = 3.01 | n7 = 1.72000 | ν7 = 43.7 |
| r14 = −49.730 | d14 = 0.15 | | |
| r15 = 94.159 | d15 = 4.00 | n8 = 1.74400 | ν8 = 44.8 |
| r16 = −39.071 | d16 = 0.48 | | |
| r17 = −35.386 | d17 = 1.80 | n9 = 1.65446 | ν9 = 33.6 |
| r18 = 44.497 | d18 = Variable | | |
| r19 = −31.244 | d19 = 4.66 | n10 = 1.75520 | ν10 = 27.5 |
| r20 = −59.260 | d20 = 0.15 | | |
| r21 = 586.940 | d21 = 5.17 | n11 = 1.74400 | ν11 = 41.8 |
| r22 = −44.721 | | | |

| Variable | Magnification | | |
|---|---|---|---|
| Separation | 1/∞ | 0.5 | 1.0 |
| d6 | 3.016 | 14.996 | 25.904 |
| d11 | 25.887 | 13.907 | 3.000 |
| d12 | 12.941 | 9.070 | 2.971 |
| d18 | 6.241 | 10.111 | 16.210 |

Numerical Example 9:
f = 100.0    FNo = 1:3.6    2ω = 24.4°

| r1 = 97.671 | d1 = 5.68 | n1 = 1.62299 | ν1 = 58.1 |
|---|---|---|---|
| r2 = −239.902 | d2 = 0.10 | | |
| r3 = 39.912 | d3 = 1.84 | n2 = 1.80518 | ν2 = 25.4 |
| r4 = 23.484 | d4 = 0.10 | | |
| r5 = 23.535 | d5 = 6.50 | n3 = 1.62280 | ν3 = 57.1 |

-continued

Numerical Example 9:
f = 100.0    FNo = 1:3.6    2ω = 24.4°

| r6 = 470.309 | d6 = Variable | | |
| r7 = −192.225 | d7 = 1.00 | n4 = 1.81600 | v4 = 46.6 |
| r8 = 35.985 | d8 = 0.45 | | |
| r9 = 44.830 | d9 = 1.00 | n5 = 1.62041 | v5 = 60.3 |
| r10 = 19.928 | d10 = 4.56 | n6 = 1.84666 | v6 = 23.9 |
| r11 = 30.873 | d11 = Variable | | |
| r12 = Stop | d12 = Variable | | |
| r13 = −122.290 | d13 = 3.81 | n7 = 1.74100 | v7 = 52.6 |
| r14 = −51.031 | d14 = 3.35 | | |
| r15 = 99.750 | d15 = 4.00 | n8 = 1.78650 | v8 = 50.0 |
| r16 = −40.284 | d16 = 0.28 | | |
| r17 = −37.342 | d17 = 4.00 | n9 = 1.66680 | v9 = 33.0 |
| r18 = 47.768 | d18 = Variable | | |
| r19 = −33.527 | d19 = 4.18 | n10 = 1.86300 | v10 = 41.5 |
| r20 = −55.054 | d20 = 0.15 | | |
| r21 = −320.286 | d21 = 5.29 | n11 = 1.80400 | v11 = 46.6 |
| r22 = −50.888 | | | |

| Variable | Magnification | | |
| --- | --- | --- | --- |
| Separation | 1/∞ | 0.5 | 1.0 |
| d6 | 3.064 | 14.972 | 25.478 |
| d11 | 25.414 | 13.506 | 3.000 |
| d12 | 11.833 | 8.728 | 2.867 |
| d18 | 6.446 | 9.551 | 15.411 |

TABLE 2

| Condition | Numerical Example | | | |
| --- | --- | --- | --- | --- |
| No. & Factor | 6 | 7 | 8 | 9 |
| (7) f1/f | 0.512 | 0.529 | 0.499 | 0.498 |
| (8) f2/f | −0.383 | −0.432 | −0.369 | −0.339 |
| (9) f3/f | 1.08 | 0.848 | 1.598 | 1.759 |
| (10) Δs2/|Δs3| | 1.026 | 0.910 | 2.296 | 2.500 |

It will be appreciated from the foregoing that the rules of lens design described above are set forth to correct well the variation of aberration with focusing in a wide range from an infinitely distant object to a minimum-distance object, especially in the closeup range up to life-size, thus making it possible to realize a photographic lens whose F-number is about 3.5 and whose field angle is about 24 degrees, and which utilizes the floating technique, while still permitting a high optical performance to be maintained throughout the focusing range.

Third Embodiment

A further embodiment of the invention which is directed to a camera (photographing apparatus) using the photographic lens in one of the above numerical examples 1 to 9 is described with reference to FIG. 19.

Figure 19:
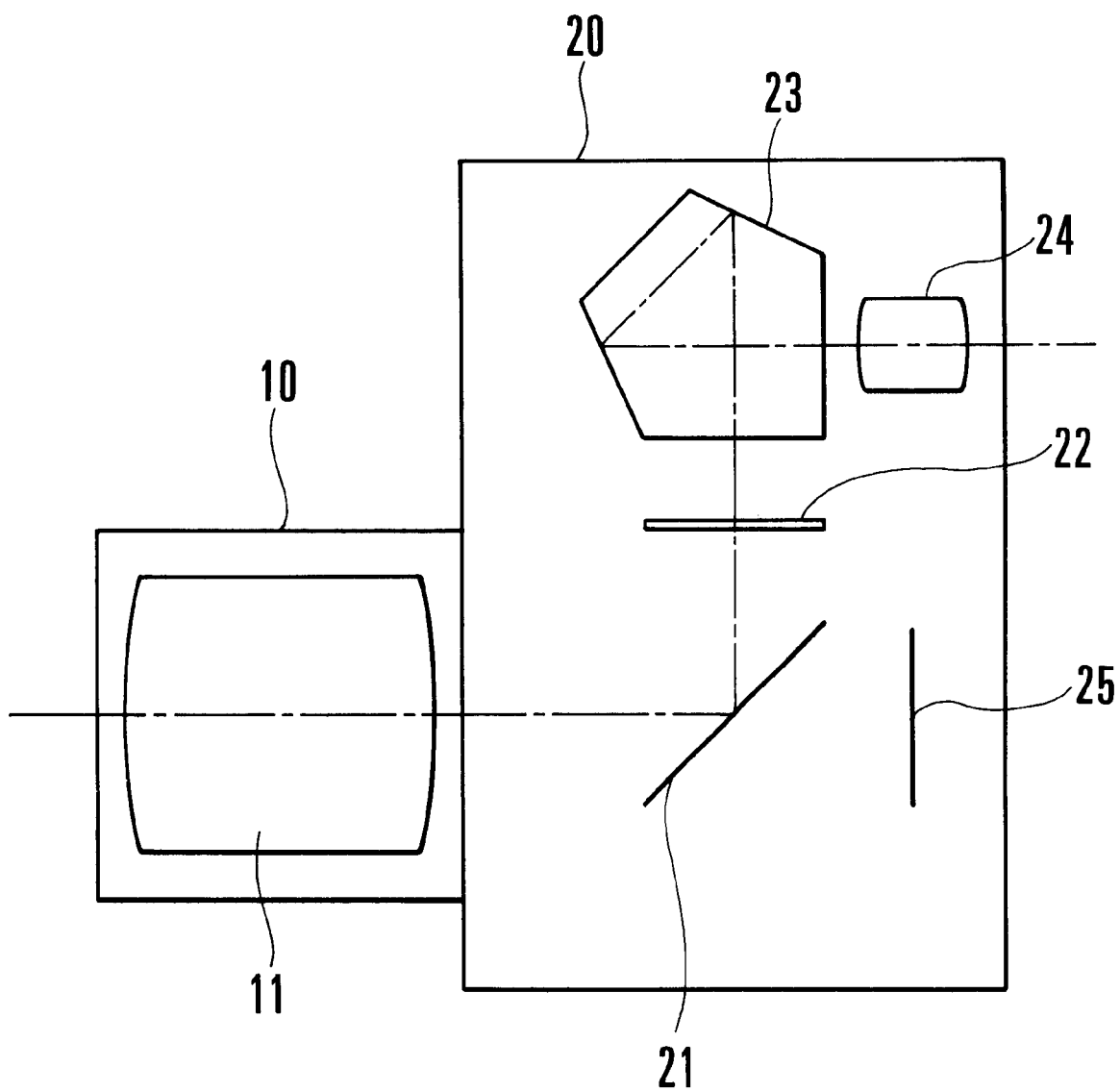
FIG. 19 is a schematic diagram of the main parts of a photographing apparatus using the photographic lens of one of the numerical examples 1 to 9.

In FIG. 19, a lens barrel 10 containing the photographic lens 11 shown in one of the numerical examples 1 to 9 is attached to a camera body 20. Light entering through the photographic lens 11 is reflected upward by a mirror 21 to a focusing screen 22 where an image of an object is formed by the photographic lens 11. The rays of light radiating from the focusing screen 22 advance to a pentagonal roof prism 23 for erecting the image and therefrom to an eyepiece lens 24, reaching an eye of the photographer. FIG. 19 shows the viewing position (waiting for a shutter release). When the photographer pushes a release button, the mirror 21 retracts from the optical path and the object image is formed on silver-halide film 25.

As described above, the photographic lens shown in one of the numerical examples 1 to 9 is used in the camera. Accordingly, a camera capable of wide-range focusing from infinity to a life-size image or thereabout and capable of obtaining images of good quality over the entire extended focusing range can be attained.

What is claimed is:

1. A photographic lens comprising, in order from an object side to an image side:

a first lens unit of positive refractive power;

a second lens unit of negative refractive power;

a third lens unit of positive refractive power; and a fourth lens unit of negative refractive power, wherein, during focusing from an infinitely distant object to a minimum-distance object, said first lens unit remains stationary, said second lens unit moves toward the image side, said third lens unit moves toward the object side and said fourth lens unit moves in such a way as to include a locus convex toward the object side.

2. A photographic lens according to claim 1, wherein said first lens unit has a positive lens disposed closest to the object side.

3. A photographic lens according to claim 1, further comprising:

a stop disposed in a space between said second lens unit and said third lens unit and arranged to determine an aperture opening, said stop remaining stationary during focusing.

4. A photographic lens according to claim 1, further comprising:

a flare cut stop arranged to cut off stray light.

5. A photographic lens according to claim 4, where said flare cut stop is disposed in a space between said second lens unit and said third lens unit.

6. A photographic lens according to claim 5, where said flare cut stop moves integrally with said third lens unit during focusing.

7. A photographic lens according to claim 1, wherein said second lens unit has a cemented lens.

8. A photographic lens according to claim 1, wherein said third lens unit has a cemented lens.

9. A photographic lens according to claim 1, satisfying the following condition:

$$0.4 < f1/f < 0.8$$

where f1 is a focal length of said first lens unit, and f is a focal length of said photographic lens.

10. A photographic lens according to claim 1, satisfying the following condition:

$$-0.6 < f2/f < -0.3$$

where f2 is a focal length of said second lens unit, and f is a focal length of said photographic lens.

11. A photographic lens according to claim 1, satisfying the following condition:

$$0.3 < f3/f < 0.6$$

where f3 is a focal length of said third lens unit, and f is a focal length of said photographic lens.

12. A photographic lens according to claim 1, satisfying the following condition:

$$-1.8 < f4/f < -0.5$$

where f4 is a focal length of said fourth lens unit, and f is a focal length of said photographic lens.

13. A photographic lens according to claim 1, satisfying the following condition:

$$0.3 < \Delta s2/|\Delta s3| < 2.0$$

where $\Delta s2$ and $\Delta s3$ are amounts of movement of said second lens unit and said third lens unit, respectively, during focusing from an infinitely distant object to a minimum-distance object.

14. A photographic lens according to claim 1, satisfying the following condition:

$$1.35 < \beta 4\infty < 2.5$$

where $\beta 4\infty$ is a lateral magnification of said fourth lens unit when focusing on an infinitely distant object.

15. A photographic lens comprising, in order from an object side to an image side:

a first lens unit of positive refractive power;

a second lens unit of negative refractive power;

a third lens unit of positive refractive power; and a fourth lens unit of positive refractive power, wherein, during focusing from an infinitely distant object to a minimum-distance object, said first lens unit and said fourth lens unit remain stationary, said second lens unit moves toward the image side and said third lens unit moves toward the object side, and wherein, during a maximum photographic magnification, a separation between said second lens unit and said third lens unit is made minimum, said photographic lens satisfying the following conditions:

$$0.45 < f1/f < 0.6$$

$$-0.48 < f2/f < -0.29$$

$$0.76 < f3/f < 1.85$$

where f is a focal length of said photographic lens, f1 is a focal length of said first lens unit, f2 is a focal length of said second lens unit, and f3 is a focal length of said third lens unit.

16. A photographic lens according to claim 15, satisfying the following condition:

$$0.43 < \Delta s2/|\Delta s3| < 2.98$$

where $\Delta s2$ and $\Delta s3$ are amounts of movement of said second lens unit and said third lens unit, respectively, during focusing from an infinitely distant object to a minimum-distance object, the amount of movement toward the image side being taken as positive and the amount of movement toward the object side being taken as negative.

17. A photographic lens according to claim 15, further comprising a stop disposed in a space between said second lens unit and said third lens unit and arranged to remain stationary during focusing.

18. A photographic lens according to claim 15, wherein said second lens unit has a cemented lens composed of a negative lens and a positive lens.

19. A photographic lens according to claim 15, wherein said first lens unit consists of a positive lens of bi-convex form, a negative lens of meniscus form convex toward the object side and a positive lens of meniscus form convex toward the object side.

20. A photographic lens according to claim 15, wherein said second lens unit consists of a negative lens of bi-concave form, a negative lens of meniscus form convex toward the object side and a positive lens of meniscus form convex toward the object side.

21. A photographic lens according to claim 15, wherein said third lens unit consists of a positive lens of meniscus form convex toward the image side, a positive lens of bi-convex form and a negative lens of bi-concave form.

22. A photographic lens according to claim 15, wherein said fourth lens unit consists of a negative lens of meniscus form convex toward the image side and a positive lens of bi-convex form.

23. A photographing apparatus comprising:

a photographic lens according to one of claims 1 to 22.

* * * * *

UNITED STATES PATENT AND TRADEMARK OFFICE
CERTIFICATE OF CORRECTION

PATENT NO. : 6,246,833 B1
DATED : June 12, 2001
INVENTOR(S) : Akira Harada

It is certified that error appears in the above-identified patent and that said Letters Patent is hereby corrected as shown below:

Column 12,
Line 61, "lens-of" should read -- lens of --.

Signed and Sealed this

Twenty-first Day of June, 2005

JON W. DUDAS
*Director of the United States Patent and Trademark Office*

UNITED STATES PATENT AND TRADEMARK OFFICE
CERTIFICATE OF CORRECTION

PATENT NO. : 6,246,833 B1
DATED : June 12, 2001
INVENTOR(S) : Akira Harada

It is certified that error appears in the above-identified patent and that said Letters Patent is hereby corrected as shown below:

<u>Column 16, line 12 - Column 18, line 41,</u>
Claims 1-23 should be deleted and substituted with the following claims 1-23:

--1. A photographic lens comprising, in order from an object side to an image side:

a first lens unit of positive refractive power;

a second lens unit of negative refractive power;

a third lens unit of positive refractive power; and a fourth lens unit of negative refractive power, wherein said second, third, and fourth lens units are configured to move cooperatively to focus from an infinitely distant object to a minimum-distance object, and wherein, during focusing from the infinitely distant object to the minimum-distance object, said first lens unit remains stationary, said second lens unit moves toward the image side, said third lens unit moves toward the object side and said fourth lens unit moves in such a way as to include a locus convex toward the object side.

2. A photographic lens according to claim1, wherein said first lens unit has a positive lens disposed closest to the object side.

3. A photographic lens according to claim1, wherein said third lens unit has a cemented lens.

4. A photographic lens comprising, in order from an object side to an image side:

a first lens unit of positive refractive power;

a second lens unit of negative refractive power;

a third lens unit of positive refractive power;

a fourth lens unit of negative refractive power; and a stop disposed in a space between said second lens unit and said third lens unit and arranged to determine an aperture opening, wherein, during focusing from an infinitely distant object to a minimum-distance object, said first lens unit remains stationary, said second lens unit moves toward the image side, said third lens unit moves toward the object side, said fourth lens unit moves in such a way as to include a locus convex toward the object side, and said stop remains stationary.

UNITED STATES PATENT AND TRADEMARK OFFICE
CERTIFICATE OF CORRECTION

PATENT NO. : 6,246,833 B1
DATED : June 12, 2001
INVENTOR(S) : Akira Harada

It is certified that error appears in the above-identified patent and that said Letters Patent is hereby corrected as shown below:

Column 16, line 12 - Column 18, line 41 (cont'd),

5. A photographic lens comprising, in order from an object side to an image side:

a first lens unit of positive refractive power;

a second lens unit of negative refractive power;

a third lens unit of positive refractive power;

a fourth lens unit of negative refractive power; and a flare cut stop arranged to cut off stray light, wherein, during focusing from an infinitely distant object to a minimum-distance object, said first lens unit remains stationary, said second lens unit moves toward the image side, said third lens unit moves toward the object side and said fourth lens unit moves in such a way as to include a locus convex toward the object side.

6. A photographic lens according to claim 5, where said flare cut stop is disposed in a space between said second lens unit and said third lens unit.

7. A photographic lens according to claim 6, where said flare cut stop moves integrally with said third lens unit during focusing.

8. A photographic lens comprising, in order from an object side to an image side:

a first lens unit of positive refractive power;

a second lens unit of negative refractive power;

a third lens unit of positive refractive power; and a fourth lens unit of negative refractive power, wherein, during focusing from an infinitely distant object to a minimum-distance object, said first lens unit remains stationary, said second lens unit moves toward the image side, said third lens unit moves toward the object side and said fourth lens unit moves in such a way as to include a locus convex toward the object side, and wherein said second lens unit has a cemented lens.

UNITED STATES PATENT AND TRADEMARK OFFICE
CERTIFICATE OF CORRECTION

PATENT NO. : 6,246,833 B1
DATED : June 12, 2001
INVENTOR(S) : Akira Harada

It is certified that error appears in the above-identified patent and that said Letters Patent is hereby corrected as shown below:

Column 16, line 12 - Column 18, line 41 (cont'd),

9. A photographic lens comprising, in order from an object side to an image side:

a first lens unit of positive refractive power;

a second lens unit of negative refractive power;

a third lens unit of positive refractive power; and a fourth lens unit of negative refractive power, wherein, during focusing from an infinitely distant object to a minimum-distance object, said first lens unit remains stationary, said second lens unit moves toward the image side, said third lens unit moves toward the object side and said fourth lens unit moves in such a way as to include a locus convex toward the object side, and wherein said photographic lens satisfies the following condition:

$0.4 < f1/f < 0.8$ where f1 is a focal length of said first lens unit, and f is a focal length of said photographic lens.

10. A photographic lens comprising, in order from an object side to an image side:

a first lens unit of positive refractive power;

a second lens unit of negative refractive power;

a third lens unit of positive refractive power; and a fourth lens unit of negative refractive power, wherein, during focusing from an infinitely distant object to a minimum-distance object, said first lens unit remains stationary, said second lens unit moves toward the image side, said third lens unit moves toward the object side and said fourth lens unit moves in such a way as to include a locus convex toward the object side, and wherein said photographic lens satisfies the following condition:

$-0.6 < f2/f < -0.3$ where f2 is a focal length of said second lens unit, and f is a focal length of said photographic lens.

UNITED STATES PATENT AND TRADEMARK OFFICE
CERTIFICATE OF CORRECTION

PATENT NO. : 6,246,833 B1
DATED : June 12, 2001
INVENTOR(S) : Akira Harada

It is certified that error appears in the above-identified patent and that said Letters Patent is hereby corrected as shown below:

Column 16, line 12 - Column 18, line 41 (cont'd),

11. A photographic lens comprising, in order from an object side to an image side:

a first lens unit of positive refractive power;

a second lens unit of negative refractive power;

a third lens unit of positive refractive power; and a fourth lens unit of negative refractive power, wherein, during focusing from an infinitely distant object to a minimum-distance object, said first lens unit remains stationary, said second lens unit moves toward the image side, said third lens unit moves toward the object side and said fourth lens unit moves in such a way as to include a locus convex toward the object side, and wherein said photographic lens satisfies the following condition:

$0.3 < f_3/f < 0.6$ where $f_3$ is a focal length of said third lens unit, and $f$ is a focal length of said photographic lens.

12. A photographic lens comprising, in order from an object side to an image side:

a first lens unit of positive refractive power;

a second lens unit of negative refractive power;

a third lens unit of positive refractive power; and a fourth lens unit of negative refractive power, wherein, during focusing from an infinitely distant object to a minimum-distance object, said first lens unit remains stationary, said second lens unit moves toward the image side, said third lens unit moves toward the object side and said fourth lens unit moves in such a way as to include a locus convex toward the object side, and wherein said photographic lens satisfies the following condition:

$-1.8 < f_4/f < -0.5$ where $f_4$ is a focal length of said fourth lens unit, and $f$ is a focal length of said photographic lens.

UNITED STATES PATENT AND TRADEMARK OFFICE
CERTIFICATE OF CORRECTION

PATENT NO. : 6,246,833 B1
DATED : June 12, 2001
INVENTOR(S) : Akira Harada

It is certified that error appears in the above-identified patent and that said Letters Patent is hereby corrected as shown below:

Column 16, line 12 - Column 18, line 41 (cont'd),

13. A photographic lens comprising, in order from an object side to an image side:

a first lens unit of positive refractive power;

a second lens unit of negative refractive power;

a third lens unit of positive refractive power; and a fourth lens unit of negative refractive power, wherein, during focusing from an infinitely distant object to a minimum-distance object, said first lens unit remains stationary, said second lens unit moves toward the image side, said third lens unit moves toward the object side and said fourth lens unit moves in such a way as to include a locus convex toward the object side, and wherein said photographic lens satisfies the following condition:

$0.3 < \Delta s2/|\Delta s3| < 2.0$ where $\Delta s2$ and $\Delta s3$ are amounts of movement of said second lens unit and said third lens unit, respectively, during focusing from an infinitely distant object to a minimum-distance object.

14. A photographic lens comprising, in order from an object side to an image side:

a first lens unit of positive refractive power;

a second lens unit of negative refractive power;

a third lens unit of positive refractive power; and a fourth lens unit of negative refractive power, wherein, during focusing from an infinitely distant object to a minimum-distance object, said first lens unit remains stationary, said second lens unit moves toward the image side, said third lens unit moves toward the object side and said fourth lens unit moves in such a way as to include a locus convex toward the object side, and wherein said photographic lens satisfies the following condition:

$1.35 < \beta 4\infty < 2.5$ where $\beta 4\infty$ is a lateral magnification of said fourth lens unit when focusing on an infinitely distant object.

UNITED STATES PATENT AND TRADEMARK OFFICE
CERTIFICATE OF CORRECTION

PATENT NO. : 6,246,833 B1
DATED : June 12, 2001
INVENTOR(S) : Akira Harada

It is certified that error appears in the above-identified patent and that said Letters Patent is hereby corrected as shown below:

Column 16, line 12 - Column 18, line 41 (cont'd),

15. A photographic lens comprising, in order from an object side to an image side:

a first lens unit of positive refractive power;

a second lens unit of negative refractive power;

a third lens unit of positive refractive power; and a fourth lens unit of positive refractive power, wherein, during focusing from an infinitely distant object to a minimum-distance object, said first lens unit and said fourth lens unit remain stationary, said second lens unit moves toward the image side and said third lens unit moves toward the object side, and wherein, during a maximum photographic magnification, a separation between said second lens unit and said third lens unit is made minimum, said photographic lens satisfying the following conditions:

$0.45 < f1/f < 0.6$ $-0.48 < f2/f - 0.29$ $0.76 < f3/f < 1.85$ where f is a focal length of said photographic lens, f1 is a focal length of said first lens unit, f2 is a focal length of said second lens unit, and f3 is a focal length of said third lens unit.

16. A photographic lens according to claim 15, satisfying the following condition:

$0.43 < \Delta s2/|\Delta s3| < 2.98$ where $\Delta s2$ and $\Delta s3$ are amounts of movement of said second lens unit and said third lens unit, respectively, during focusing from an infinitely distant object to a minimum-distance object, the amount of movement toward the image side being taken as positive and the amount of movement toward the object side being taken as negative.

17. A photographic lens according to claim 15, further comprising a stop disposed in a space between said second lens unit and said third lens unit and arranged to remain stationary during focusing.

18. A photographic lens according to claim 15, wherein said second lens unit has a cemented lens composed of a negative lens and a positive lens.

19. A photographic lens according to claim 15, wherein said first lens unit consists of a positive lens of bi-convex form, a negative lens of meniscus form convex toward the object side and a positive lens of meniscus form convex toward the object side.

UNITED STATES PATENT AND TRADEMARK OFFICE
CERTIFICATE OF CORRECTION

| | |
|---|---|
| PATENT NO. | : 6,246,833 B1 |
| DATED | : June 12, 2001 |
| INVENTOR(S) | : Akira Harada |

It is certified that error appears in the above-identified patent and that said Letters Patent is hereby corrected as shown below:

<u>Column 16, line 12 - Column 18, line 41 (cont'd),</u>

20.    A photographic lens according to claim 15, wherein said second lens unit consists of a negative lens of bi-concave form, a negative lens of meniscus form convex toward the object side and a positive lens of meniscus form convex toward the object side.

21.    A photographic lens according to claim 15, wherein said third lens unit consists of a positive lens of meniscus form convex toward the image side, a positive lens of bi-convex form and a negative lens of bi-concave form.

22.    A photographic lens according to claim 15, wherein said fourth lens unit consists of a negative lens of meniscus form convex toward the image side and a positive lens of bi-convex form.

23.    A photographing apparatus comprising:
a photographic lens according to one of claims 1 to 22.--

Signed and Sealed this

Sixth Day of December, 2005

JON W. DUDAS
*Director of the United States Patent and Trademark Office*